United States Patent
Singer et al.

[11] Patent Number: 6,094,906
[45] Date of Patent: Aug. 1, 2000

[54] DESIGN FOR A GUN-LAUNCHED ROCKET

[75] Inventors: Victor Singer, Newark, Del.; Mark A. Solberg, Bel Air, Md.

[73] Assignee: Cordant Technologies Inc., Salt Lake City, Utah

[21] Appl. No.: 09/301,157

[22] Filed: Apr. 28, 1999

Related U.S. Application Data

[63] Continuation of application No. PCT/US97/19242, Oct. 28, 1997, which is a continuation-in-part of application No. 08/739,469, Oct. 28, 1996, Pat. No. 5,792,981.

[51] Int. Cl.[7] .................................................. F02K 9/08
[52] U.S. Cl. ........................ 60/223; 60/253; 102/381
[58] Field of Search ........................... 60/223, 253, 254; 102/381, 481

[56] References Cited

U.S. PATENT DOCUMENTS

| | | |
|---|---|---|
| H1144 | 3/1993 | Cherry et al. . |
| 2,775,201 | 12/1956 | Conway .................... 102/49 |
| 2,958,185 | 11/1960 | Sanders . |
| 3,349,708 | 10/1967 | Paget . |
| 3,434,419 | 3/1969 | Dimond et al. . |
| 3,601,056 | 8/1971 | Nicholson .............. 102/49.7 |
| 3,861,310 | 1/1975 | Mertens et al. ........ 102/49.7 |
| 3,887,991 | 6/1975 | Panella . |
| 3,922,967 | 12/1975 | Mertens .................... 102/38 |
| 4,022,130 | 5/1977 | Johnson et al. . |
| 4,423,683 | 1/1984 | Telmo . |
| 4,557,198 | 12/1985 | Hickey . |
| 4,597,261 | 7/1986 | Dolan . |
| 4,709,637 | 12/1987 | Boggero . |
| 4,714,020 | 12/1987 | Hertsgaard et al. . |
| 4,803,925 | 2/1989 | Biichele-Buecher . |
| 4,991,513 | 2/1991 | Malamas et al. . |
| 5,036,658 | 8/1991 | Tate . |
| 5,044,154 | 9/1991 | English, Jr. et al. . |
| 5,155,298 | 10/1992 | Koontz . |
| 5,311,820 | 5/1994 | Ellingsen . |
| 5,337,672 | 8/1994 | Boissiere et al. . |
| 5,361,703 | 11/1994 | Braithwaite .............. 60/223 |
| 5,398,498 | 3/1995 | Mort et al. .............. 60/223 |
| 5,786,544 | 7/1998 | Gill et al. ............... 60/223 |
| 5,792,981 | 8/1998 | Singer et al. ............ 102/481 |

FOREIGN PATENT DOCUMENTS 2652644  4/1991  France .

*Primary Examiner*—Louis J. Casaregola
*Attorney, Agent, or Firm*—Pillsbury Madison & Sutro Intellectual Property Group

[57] ABSTRACT

One embodiment of this novel rocket system employs at least one rocket motor closure that includes low and high load capability retainers that, respectively, provide an insensitive munitions system during storage and positive locking of a nozzle assembly at lunch. Another embodiment of this novel rocket involves an insensitive munitions approach that does not require use of such retainers by developing different normal and abnormal burn paths. The rocket motor also includes a pressure equalizing system that accommodates changing temperature conditions during storage as well varying gas pressure inherent in gun-launched systems in a manner that allows for thinner case cylinder design and increased propellant volume.

13 Claims, 13 Drawing Sheets

DESIGN FOR A GUN-LAUNCHED ROCKET

This is Continuation of International Appln. No. PCT/US97/19242 filed Oct. 28, 1997, which designated the United States and which is a Continuation-in-Part of U.S. application Ser. No. 08/739,469 filed Oct. 28, 1996, now U.S. Pat. No. 5,792,981.

The U.S. Government has a paid-up license in this invention and the right in limited circumstances to require the patent owner to license others on reasonable terms as provided for by the terms of Contract N00024-96-C-5204 awarded by the U.S. Navy.

BACKGROUND

1. The Field of the Invention

The present invention is related to a case and closure design for a gun-launched rocket More particularly, the present invention relates to an insensitive munitions system employing one or more passages and an internal compression chamber system which collectively accommodates gas pressures inherent in gun-launched rocket systems in a manner allowing for a thinner rocket motor case cylinder and increased propellant volume beyond what prior art permits. These systems may be used in combination or separately.

2. Technical Background

Many launchable projectiles or rockets are comprised of a forward end, including guidance and munitions, and an aft end rocket motor. These two elements can be formed together, with a common outer casing, or they can be separately formed and subsequently joined together. This joining can occur immediately prior to use, in which case the two elements must be separately stored or they can be joined together for storage purposes and be ready for immediate use.

During pre-launch storage when a rocket motor is ignited inadvertently by external heating, such as a spilled fuel fire, it will become propulsive before being properly aimed. When inadvertent ignition is caused by fragment impact that produces unplanned nozzle outlets, the motor may become wildly propulsive in undesired directions. And when such events produce unplanned increases of propellant burning surface area, excessive pressurization may increase the hazard to nearby personnel and property. In light of these dangers, many of today's weapon systems must satisfy certain insensitive munitions (IM) requirements focused on safe storage capabilities.

Where rocket motors are stored separately, one way that rocket motors meet IM requirements is by venting the internal pressure caused through inadvertent ignition of the propellant by discharging either the forward or aft closure of the case cylinder. This allows the propellant to burn through a now open end without generating substantial thrust in any direction and without the threat of the rocket motor exploding and spraying burning propellant and metal case cylinder fragments in numerous directions.

The prior art teaches the use of dual paths for load transfer between features of either closure or between the closure and the motor case cylinder. One such load path may be sized to accommodate relatively small loads expected during transportation and handling prior to gun launch, and the other to accommodate much larger loads encountered during launch or during rocket motor operation. Focusing on shells which may or may not include rocket motors, Hickey teaches in U.S. Pat. No. 4,557,198 (1985) use of shear pins or locking rings arranged so that the high load capability load path is armed by axial acceleration during normal launch (with or without spin-up of the round) which also disarms the low capability load path. Boissiere, in U.S. Pat. No. 5,337,672 (1994), teaches arming of the high capability load path and disarming the low capability load path by gas pressures produced by the round itself. Dolan, in U.S. Pat. No. 4,597,261 (1986), Panella in U.S. Pat. No. 3,887,991 (1975), Tate in U.S. Pat. No. 5,036,658 (1991), Koontz in U.S. Pat. No. 5,155,298 (1992), Ellingsen in U.S. Pat. No. 5,311,820 (1994), and Cherry, in Statutory Invention Registration H1144 (1993), teach use of thermally activated devices of similar intent. Further, Malamas in U.S. Pat. No. 4,991,513 teaches use of a vent system that is closed by spin-up at launch.

As will be shown below, the safe expulsion of either closure can also be accomplished through the use of a low shear retaining means positioned between components of the closure or between the closure and the rocket motor case cylinder and a high capability load path that is disarmed until subjected to gun pressure. Should the propellant be inadvertently ignited, the low shear retention means will shear under relatively low internal pressure and allow the entire closure, or a portion thereof, to disengage from the case cylinder. Thus, the internal pressure induced by inadvertent ignition will vent without the dangers associated with premature propulsion or explosion.

As will further be shown below, advantageous use of gun pressure to arm a high capability load path may be combined with a further use to diminish the inert—non-propellant—weight of the gun-launched projectile.

Rocket motors are used to propel a payload. The amount of payload that can be propelled, as well as how fast and how far, are substantially affected by the weight—or mass—of the rocket motor components themselves. For the most demanding mission performance requirements, rocket motor designers focus intently on minimizing the inert weight of the motor itself.

Some rocket motors are intended for use in gun-launched projectiles, either in a "sustain" mode that diminishes losses of velocity or range due to one friction, or in a "boost" mode that increases the velocity beyond what is imparted by the gun pressure and gun tube length. In the prior art relating to such applications, the high pressures and accelerations imparted to the projectile during gun launch demand significant increases in the rocket motor inert weight—beyond what would otherwise be needed for motor operation alone.

In addition, the gun accelerations may threaten the integrity of the propellant charge itself unless great care is exercised over its configuration and means of support. Accelerations imposed within the gun tube upon gun-launched projectiles are hundreds—even thousands—of times larger than those for rocket launched projectiles.

There are two types of solid propellants for rockets. In one type, which consists of compressed powder, virtually the entire cumulative surface area of all the particles is available for combustion immediately upon ignition. In the other type, the fuel and oxidizer particles are bound together by a rubber matrix forming a composite which becomes solid after a cure protocol of thermal or other character. With the composite propellants, the burning surface area is readily controlled by adjusting the shape of the solid material and the burn rate features of the formulation. During the burn of a compressed powder propellant, vastly higher operating pressures prevail than during burn of a like quantity of composite propellants. It follows that compressed powder propellants are generally used only where the gun barrel can be used to withstand the high pressures. When the propellant is to burn after the rocket leaves the gun, it is generally a composite propellant.

The thermal expansion characteristic of composite solid propellants is typically an order of magnitude larger than that of the enclosing or containing structure. A 100° F. operating temperature range therefore produces a volume change of about 2%. Unless the configuration and support arrangement allow deformations to occur, thermal stresses in the propellant may cause fractures, undesired increases of burning surface area, and disasters upon ignition. Common provisions for thermal expansion include a central axial perforation for propellant grains bonded on their outer circumferential surfaces to cylindrical vessels, and completely free outer surfaces for propellant grains bonded at either their forward or aft ends to vessel closure features.

The tensile and shear strengths and elastic moduli of typical propellants are minuscule in comparison with the containing structure. For this reason, departures from a hydrostatic stress state during gun launch are accompanied by large deformations. At high forward acceleration, the propellant grain tends to completely fill the available volume of the aft end of the containing vessel. For a free-standing grain supported at its aft end with an unbonded circumferential surface, a 10,000 g environment and a 17 inch axial length lead to a 10,000 psi hydrostatic compression at the support.

During gun launch, alternatives to the aft end support arrangement for the propellant grain are grave threats to its integrity. Indeed, at acceleration levels typical of gun launches, neither the bonded circumferential surface of an axially perforated propellant grain nor an unperforated grain with a bonded forward end is stiff enough to eliminate the aft end support mode unless there is a great deal of empty space within the motor.

It follows that virtually the entire force that accelerates the propellant grain during gun launch is applied by direct bearing through its aft end. It also follows that in a 17 inch long propellant grain of a typical propellant, the bearing stress will be 10,000 psi at an acceleration of 10,000 g's. It follows also that the circumferential surface of the propellant grain will expand to fill the cylinder, imposing a radial pressure varying with depth (hydrostatically) from 10,000 psi at the aft end to zero at the forward end.

Therefore, during gun launch, the case cylinder experiences tension in the hoop direction due to internal pressure that may well be several times larger than the operating pressure later in flight, when the propellant burns. Moreover, during gun launch, the axial force needed to accelerate the payload, forward of the rocket motor, must be carried around the propellant grain, by axial compression in the rocket motor case, which must be proportioned so that buckling does not occur.

The buckling load for an axially compressed thin cylinder depends on its radius, thickness and length, and upon a single material property, the modulus of elasticity, at the actual imposed effective stress level. When the material "yields", the modulus decreases from the initial value, Young's modulus, to zero eventually (for ductile metals). The effective stress (von Mises yield criterion) under the combined hoop tension and axial compression stress state imposed during gun launch can be as much as 73% above the hoop or axial stress, whichever is larger. Effectively, the material yields under the mixed tension and compression condition at a far lower stress level than if either stress were acting alone, and the modulus of elasticity—and the buckling load—are thereafter much reduced. Thus, the thickness needed to assure a suitable safety factory is much higher than would be deduced for either the internal pressure or axial force alone.

In recent years, efforts to overcome the above-described behaviors of both the propellant and the case cylinder have turned to admitting the gun pressure to the interior of the rocket motor case. Paget, in U.S. Pat. No. 3,349,708, discloses several embodiments of a firearm launched rocket projectile that contains a solid fuel and permits gun bore gases to enter within the aft end. Paget is concerned with keeping the casing thin and suggests this can be achieved using passageways that distribute equal gun bore pressures on both the inside and outside of the projectile. The gun propulsion gases must also come into contact with the solid fuel used by Paget as that is the source of fuel ignition. Pins or springs hold passageways open to initially receive gun propulsion gases with such passageways being closed once the projectile exits the bore of the arm.

Another approach has included filling the internal free volume with a soft-extrudable fluid, rubber or otherwise. Thus, the fluid moves in and out of the rocket motor, through the nozzle throat orifice, as the storage temperature changes, and the nozzle exit cone becomes a reservoir for excess fluid. The fluid is ejected when the propellant is ignited.

Admitting the gun pressure to the interior of the rocket motor, with the fluid void-filler, has both obvious and subtle implications. Among the obvious is that unless the exterior surface of the rocket motor is also exposed to gun pressure, the case cylinder will have to accommodate as much as 60,000 psi internal pressure, or more—an order of magnitude above the usual range of rocket motor operating pressures. To accomplish this, the obturator, the sliding seal between the projectile and the gun tube that prevents the gun pressure from escaping around the projectile, is moved from the aft to the forward end of the rocket motor. It follows that, for the quasi-static situation at maximum acceleration, the differential pressure across the case cylinder wall is external pressure of varying magnitude, reflecting the hydrostatic gradient in the propellant grain. Further, the axial compression in the case cylinder disappears because the accelerating force for the payload is applied directly to the forward closure.

The subtle implications reflect the dynamic situations as the gun pressure rises rapidly upon ignition, and as the gun pressure disappears when the obturator passes out of the gun bore. At the outside, because the orifice into the rocket motor is quite small, the intensity of the gun pressure applied to its interior lags the pressure intensity applied to the exterior. This threatens to buckle the case if the duration of the lag is large enough. Also when the obturator clears the gun bore, the small nozzle orifice prevents an instantaneous drop of internal pressure after the external pressure disappears. This threatens to burst the case unless it has been made thick enough to withstand the gun pressure level—acting alone— that prevails immediately before the obturator clears the gun bore.

Gun-launched rocket motors are obviously limited in their outside diameter by the size of the gun bore from which they are fired. Thus, given usual propellants and rocket motor nozzles, greater range or velocity is achieved for the projectile by configuring the rocket motor such that it can hold a maximum amount of propellant.

The volume of propellant in gun launched rocket motors is maximized when the interior diameter of the rocket motor case cylinder is maximized by making the case cylinder as thin as possible. However, the case cylinder must be thick enough to accommodate gun launch loads, and, when gun pressure is allowed within the case cylinder, the pressure differentials between the inside and outside of the case cylinder, not only at maximum levels, but as the gun pressure rises early during launch and falls as the rocket motor exits the gun bore. Rocket motors designed according to the prior art must therefore survive gun launch loadings that are frequently far more severe than the later loadings during rocket motor burn. This requires thicker structures which diminish the volume available for propellant, and which increase the inert weight of the motor, thereby diminishing the attainable range or velocity of the projectile.

Thus, an advancement over the prior art is achieved by introducing rocket motor configuration features that diminish the net loads that the rocket motor case cylinder must be designed to withstand during gun launch, thereby diminishing the inert weight and increasing the available propellant volume while also providing an insensitive munitions case and closure design for a gun-launched rocket motor.

Such gun-launched rocket motor configuration features are disclosed and claimed herein.

SUMMARY OF THE PRESENT INVENTION

The present invention relates to a gun launchable rocket and in particular to a novel rocket motor design for use with that rocket. It was important to develop an approach for constructing a rocket motor that would not only produce the optimum results desired of getting the payload delivered to an appropriate point but to do so in a way that increases the range of the entire rocket, and proves the ability of the rocket motor to withstand the launch sequence, provides a way to accommodate size variations of the solid propellant as temperature conditions vary, while the rocket motor is being transported or stored, and incorporate in the insensitive munition capability by having the closures to the rocket motor closed but shearably closed.

In order to accomplish the latter, the present invention includes a variety of coupling techniques that include both low capability shear features to permit the rocket motor to be rendered relatively harmless should the solid propellant inappropriately ignite while being stored or transported, thus rendering the munition insensitive and high capability shear features armed by the gun pressure environment, that provide for the substantially higher loads imposed during normal operation. Further, the present invention involves a redesigned interior for the motor itself to provide an interior environment controlled movable piston. This movable piston will not only accommodate volume changes due to temperature variations that can affect the solid propellant, but also permits the construction of the rocket motor from thinner and lighter materials. By constructing the motor this way, not only is the available volume for propellant increased but the overall inert weight is reduced, both of which tend to increase the range and effectiveness of the rocket motor itself. In addition, the new designed interior will accommodate the substantial gun pressures associated with gun launched projectiles and enables a rocket motor structure design with the ability to withstand a dramatic rapid rise and dramatic sudden fall in pressure associated with gun launched rockets.

The present invention develops a plurality of internal compression chambers which are connected to the bore of the gun by orifices designed to have the gun pressure arriving and each being substantially equal in magnitude. Further, the use of the obturator at the forward end of the rocket motor area on the rocket, in conjunction with the internal compression chamber, provides a way to minimize the difference between internal and external pressures which vary rapidly as the rocket progresses down the gun bore, Moreover, nearly the full gun pressure applied to the inner surface of the forward closure provides the accelerating force for the payload farther forward. The axial force in the case cylinder is reduced to merely the low level required to accelerate the aft closure and other features farther aft, acting in axial tension. The present invention is constructed and designed so that the materials used for the structure, preferably an 18 Ni 300 Maraging Steel, will have sufficient capacities, for the thicknesses of the parts used, to resist all imposed loadings with ample safety margins, thereby providing effective structure for the rocket motor.

Other objects, features, and characteristics of the present invention will become apparent upon consideration of the following description with reference to the accompanying drawings, all of which form a part of the specification, and wherein like reference numerals designate corresponding parts in the various figures.

DETAILED DESCRIPTION OF THE PREFERRED EMBODIMENTS

Figure 1:
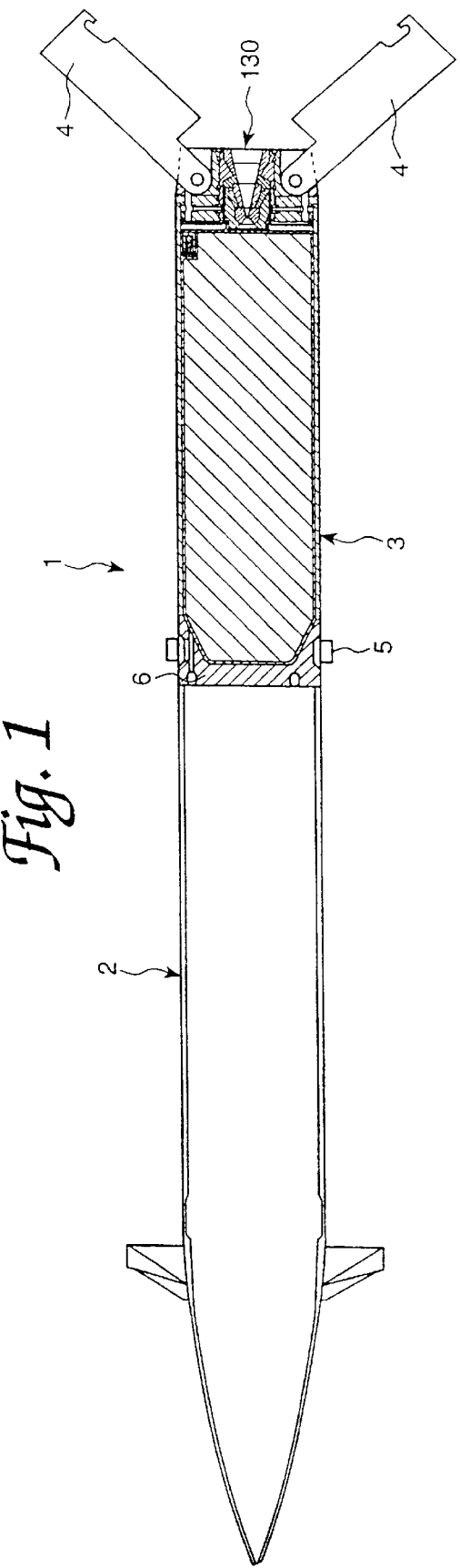
FIG. 1 is a partially elevational and partially cross-sectional view of a rocket incorporating a rocket motor according to the present invention.

FIG. 1 shows a rocket, generally indicated at 1, that includes a forward end 2, that can contain some payload, such as, for example, a guidance system and an explosive charge, and an aft rocket motor, generally indicated at 3, that is shown in partial cross-section. Included at the back end is a nozzle assembly, generally indicated at 130, and fins 4 are shown as being pivotably attached to the rearmost portion of the rocket motor 3.

This rocket 1 is designed to be launchable by a gun or other similar weapon. In addition, the present invention hereafter focuses primarily with respect to insensitive munition (IM) systems that will be disarmed by exposure to gun pressure and an approach to reduce overall rocket motor weight while retaining essential structural integrity.

First Embodiment

Figure 2:
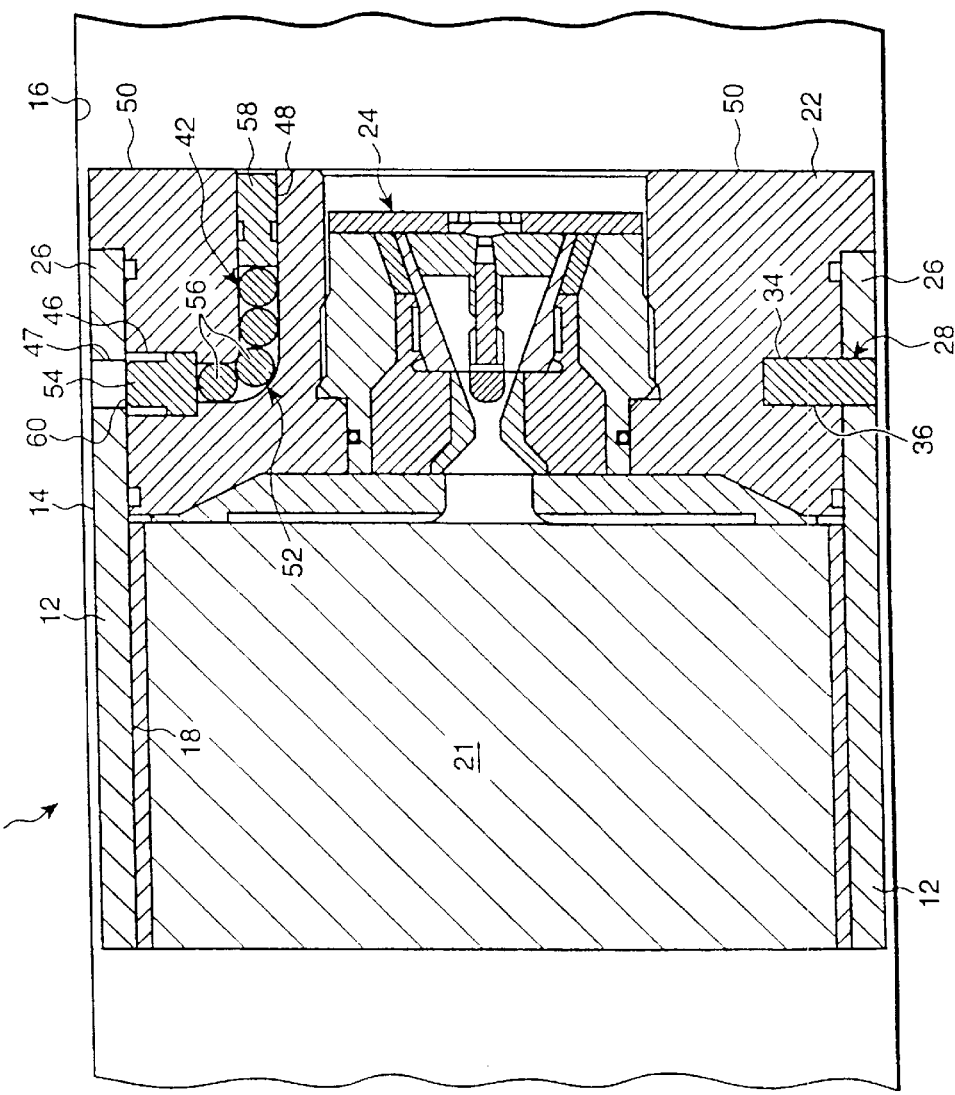
FIG. 2 is a cross-sectional view of a portion of the aft end of a rocket motor showing low and high capability shear arrangements.
Figure 3:
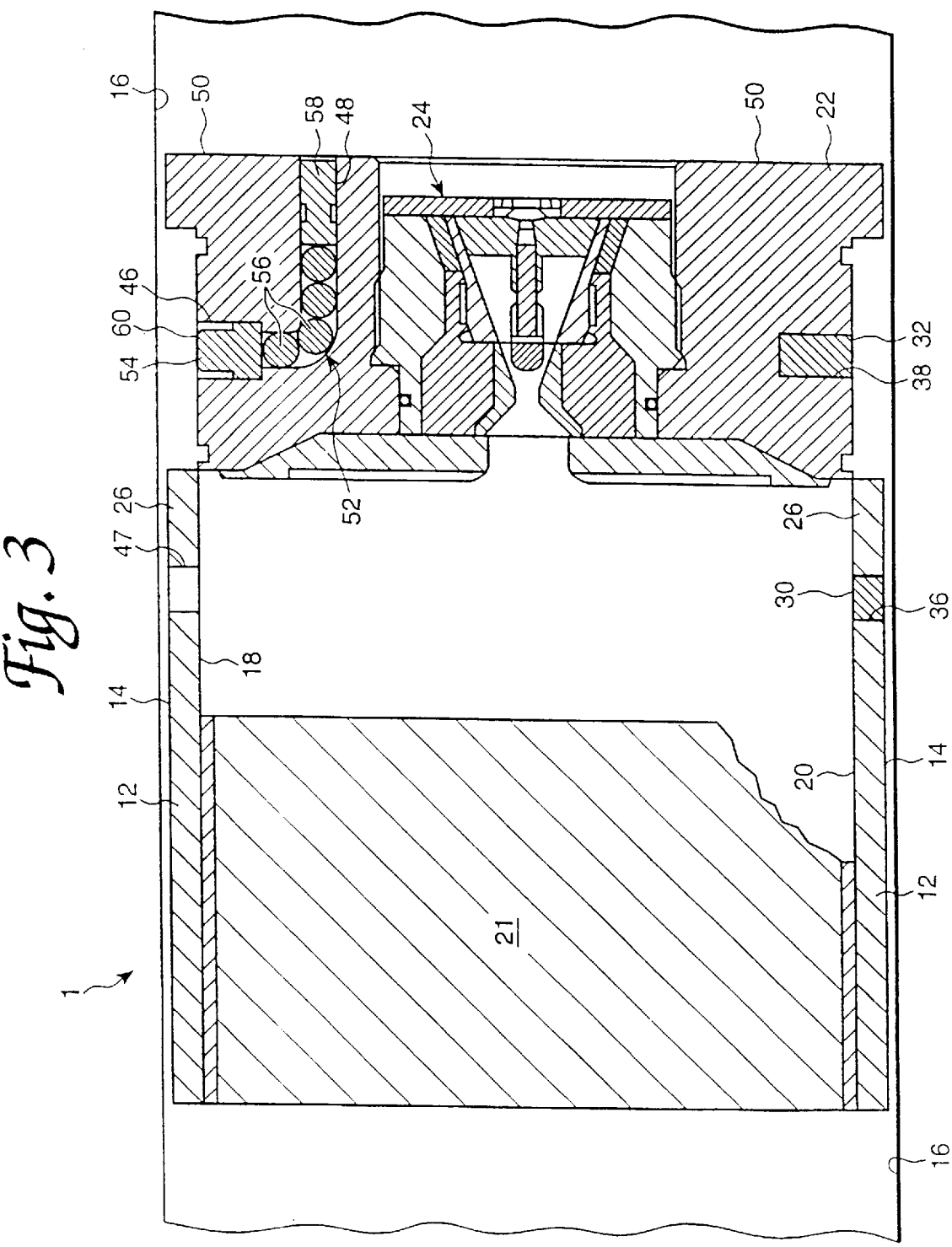
FIG. 3 is a cross-sectional view of a portion of the aft end of a rocket motor with the aft end closure separated following shearing of the low capability shear arrangement.
Figure 4:
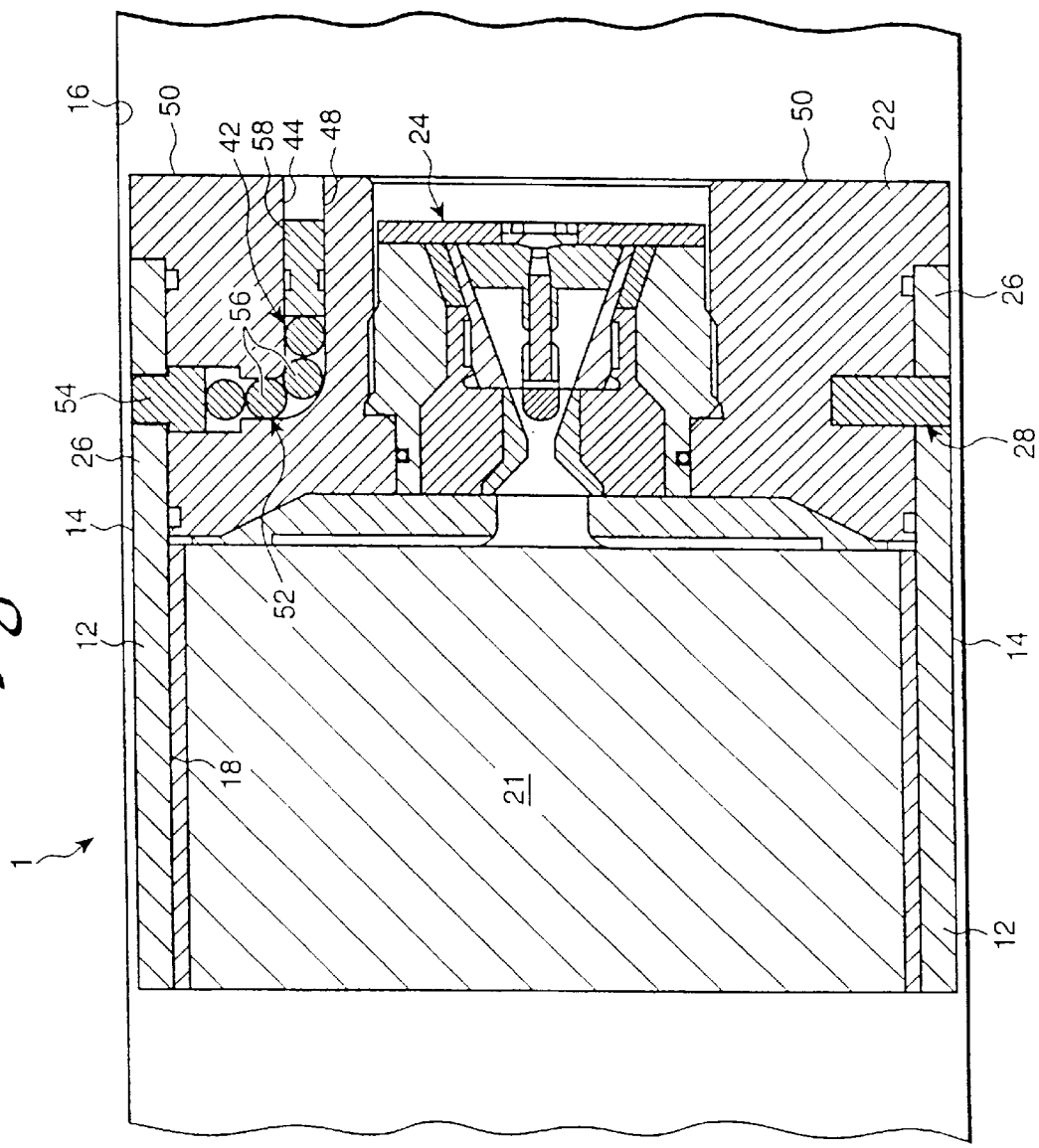
FIG. 4 is a cross-sectional view of a portion of the aft end of a rocket motor with the high capability shear device deployed.

A first embodiment for a closure, such as for the aft end of the rocket motor 3, is set forth in FIGS. 2–4. The rocket motor includes a case cylinder 12 having an exterior surface 14 configured to fit closely within a gun bore 16. An interior surface 18 of case cylinder 12 defines a propellant chamber in which a propellant grain 21 is contained. The rocket motor also includes an aft closure 22 which includes a nozzle assembly 24. The aft closure 22 is releasably secured to an aft end 26 of the case cylinder 12 by a plurality of breakable or low shear capability retainers, one of which is generally shown at 28 in FIGS. 2 and 4.

In the embodiment of FIGS. 2–4, the retainer 28 comprises a member in the form of a pin or plug that will yield and shear under relatively low load and thus has a low load capability. After being sheared, as in FIG. 3, retainer 28 has a first end 30 and a second end 32. The first end 30 remains positioned within a hole 36 that passes through the case cylinder 12 adjacent the aft end 26 of the case cylinder 12. The second end 32 remains positioned within a hole, notch or recess 38 disposed within the side wall of aft closure 22. When the aft closure 22 is initially installed in case cylinder 12, holes 36 and 38 are empty and the aft closure will be indexed relative to case cylinder 12 so that each hole 36 will be co-axially aligned with each hole, notch or recess 38. At that point a retainer 28 will be installed through each hole 36 and into each recess 38 and secured in place. The securing can be accomplished by gluing retainer 28 in the hole/notch combination, by threading the retainer in the hole/notch or by any other convenient approach so long as the retainer 28 is positively held in place. While the retainer 28 is shown at a single circumferential position, those skilled in the art will recognize that the same arrangement will be used at a plurality of circumferentially spaced apart positions about the case cylinder 12, and that the number of such positions and the type of material used for each retainer 28 will determine the load that will be resisted prior to the retainers shearing to thereby allow the aft closure 22 to separate from case cylinder 12 as depicted in FIG. 3.

With the low shear capability retainers 28 in place, axial loads arising from shipping and handling of the rocket motor prior to launch can be transmitted between the aft closure 22 and the case cylinder 12 through the low capability shear retainer interface. However, should inadvertent ignition of the rocket motor occur before gun launch, that is, should the propellant grain 21 ignite, the shear retainers 28 would shear, allowing the aft closure 22 to separate from the case cylinder 12, at a low velocity. As demonstrated in FIG. 3 where the retainer 28 has been sheared, aft end 26 of the case cylinder 12 now open completely as the aft closure 22 moves away from case cylinder 12. This large opening permits the propellant grain 21 to burn at very low pressure without rendering the rocket motor propulsive.

In one preferred embodiment, each retainer 28 is comprised of a plastic material or alternatively, a low strength aluminum. Using four such retainers, the aft closure 22 could be configured to shear under a predetermined pressure of between about 10 psi and about 20 psi. In other preferred embodiments, the low shear capability retainers 28 can shear at pressures as low as about 5 psi.

Still referring to FIGS. 2 and 4, a second type of a retainer, with high shear capability, is shown at 42 for positively securing the aft closure 22 to the aft end 26 of the case cylinder 12. Each high shear retainer 42 can move between an undeployed normal condition, shown in FIG. 2, and a deployed or actuated position, as in FIG. 4. Actuation occurs by gun pressure which operates within a passage 44 disposed within the aft closure 22 and when actuated each retainer 42 will positively lock the aft closure 22 and case cylinder 12 together. Passage 44 has a first opening 46, adjacent a seat 47 disposed within case cylinder 12 adjacent the aft end 26, and a second opening 48 adjacent an aft end 50 of aft closure 22.

Passage 44 is configured with a 90 degree bend between openings 46 and 48. The high shear retainer 42 itself comprises a movable piston 52 positioned within the passage 44. In the illustrated embodiment, piston 52 is positioned between a high capability shear member 54, positioned adjacent the first opening 46, and a metal plunger 58 located adjacent the second opening 48. Piston 52 can, for example, comprise a plurality of steel balls 56 positioned between member 54 and plunger 58. In an alternative embodiment, a suitable rubber, such as polyurethane, could be used in lieu of the balls to form a solid piston.

As noted above, the retainer 42 is capable of movement between a disarmed or undeployed/normal position, as in FIG. 2, where the piston 52 has not moved such that the high shear member 54 is not located within seat 47, and an actuated position, as shown in FIG. 4 in which the piston 52 has moved the high shear member 54 fully into seat 47. In the disarmed configuration, the second high shear capability retainer 54 has not yet secured the aft closure 22 to the case cylinder 12 so that only the low shear capability retainers 28 hold aft closure 22 in place. In the actuated positioned, the high capability shear members 54, will prevent relative movement between the aft closure 22 and case cylinder 12. The high capability shear member 54 is preferably made of a high strength material such as 18% Nickel Maraging Steel (18 Ni 300). Those skilled in the art will recognize that the second high capability shear retainers 42 will also be used at multiple circumferentially spaced apart positions about aft closure 22.

Each of the high capability shear retainers 54 remain in a disarmed or normal state prior to gun launch, and are actuated by gun pressure entering the second opening 48 of the passage 44 from the gun bore 16. The high capability shear retainers 54 will be initially held in place by a length of tape or thin metal 60 positioned to cover the first opening 46. The material 60 is used to prevent premature engagement of the piston 52 with the seat 47 and is configured to fracture under the gun pressure exerted upon it through plunger 58 and piston 52. Prior to that time very little force will have to be resisted so the tape or thin material 60 will be sufficient to hold retainers 42 in their normal position until gun pressure is applied.

Second Embodiment

Referring now to FIGS. 5–8, an alternative embodiment of the present invention is illustrated which focuses on a modified gun pressure actuated IM retainer in combination with a system that effectively reduces the inert weight of the rocket motor and enables an increase in propellant volume and thus projectile range and/or velocity. This system also provides an ability to accommodate solid propellant volume changes due to temperature variations, especially those that occur during rocket motor storage. It will be appreciated by those skilled in the art that the choice of the case cylinder material, as well as the material used for internal motor parts, is dependent upon the application, and that the length and diameter of the rocket motor play a vital role in determining how thin the case cylinder and other internal parts may be.

In order to clarify the understanding of this particular embodiment, four figures are being used that show various stages of construction and operation of the combination of features that collectively form this embodiment.

Figure 5:
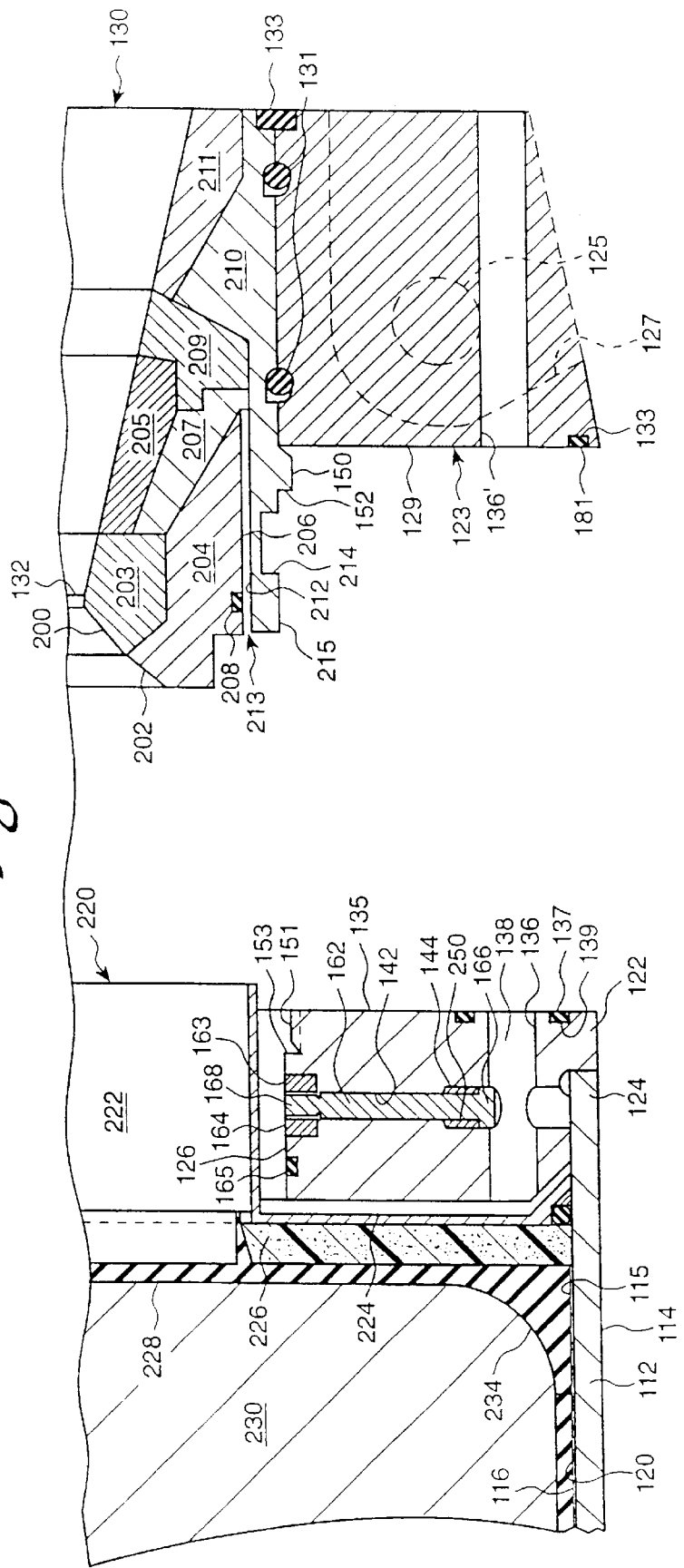
FIG. 5 is a cross-sectional view of a portion of the aft end of a rocket motor showing the nozzle assembly separated from the case cylinder.

FIG. 5 shows the back or aft end of a case cylinder 112 of a rocket 1, which has an exterior surface 114 and an interior surface 116. A separate nozzle assembly, generally indicated at 130, includes a nozzle throat 132 and a following exit cone. The exterior surface 114 of the case cylinder 112 is configured to fit closely within a gun bore 118, shown in FIGS. 7 and 8. The interior surface 116 of case cylinder 112 defines a propellant chamber 120. An obturator, shown at 5 in FIG. 1, surrounds the exterior 114 of the case cylinder 112 adjacent the forward end of the propellant chamber 120, thereby centering and sealing the rocket 1 within the gun bore 118 and preventing gun gases from escaping around the exterior of rocket 1.

An aft closure 122 is secured to the case cylinder 112 adjacent an aft end 124 of the case cylinder 112. In a presently preferred embodiment, the aft closure 122 is welded to the case cylinder 112 after the rocket is loaded with propellant. The full diameter opening provided by the welded interface permits cartridge-loading of the propellant grain which nearly completely fills the space of the propellant chamber 120 within the interior of case cylinder 112.

The case cylinder 112 and aft closure 122 are preferably made of 300 grade 18% Nickel Maraging Steel (18 Ni 300). 18 Ni 300 steel offers minimum ultimate and yield strengths in tension of 280,000 psi and 270,000 psi, respectively, and high fracture toughness in the fully hardened condition. The Maraging Steels are hardened by a thermal aging process and when welded, the weld zones exhibit the strengths of annealed material about half that of the fully hardened strengths, and very high fracture toughness. This is important in the preferred embodiment because the aft closure 122 is welded to the case cylinder 112 after the propellant is loaded, and therefore cannot be exposed to a post-weld heat treatment. If in lieu of 18% nickel maraging steel, a low alloy steel were used, the weld zone in the as-welded condition would be harder, stronger, and far more brittle than the adjacent parent metal, and therefore unsuitable for use in this fashion. The forces transmitted through the weld zone during launch and later during rocket motor burn are amply accommodated by the annealed properties of 18 Ni 300 because the adjacent closure prevents hoop stresses as large as in the case cylinder farther forward.

Figure 7:
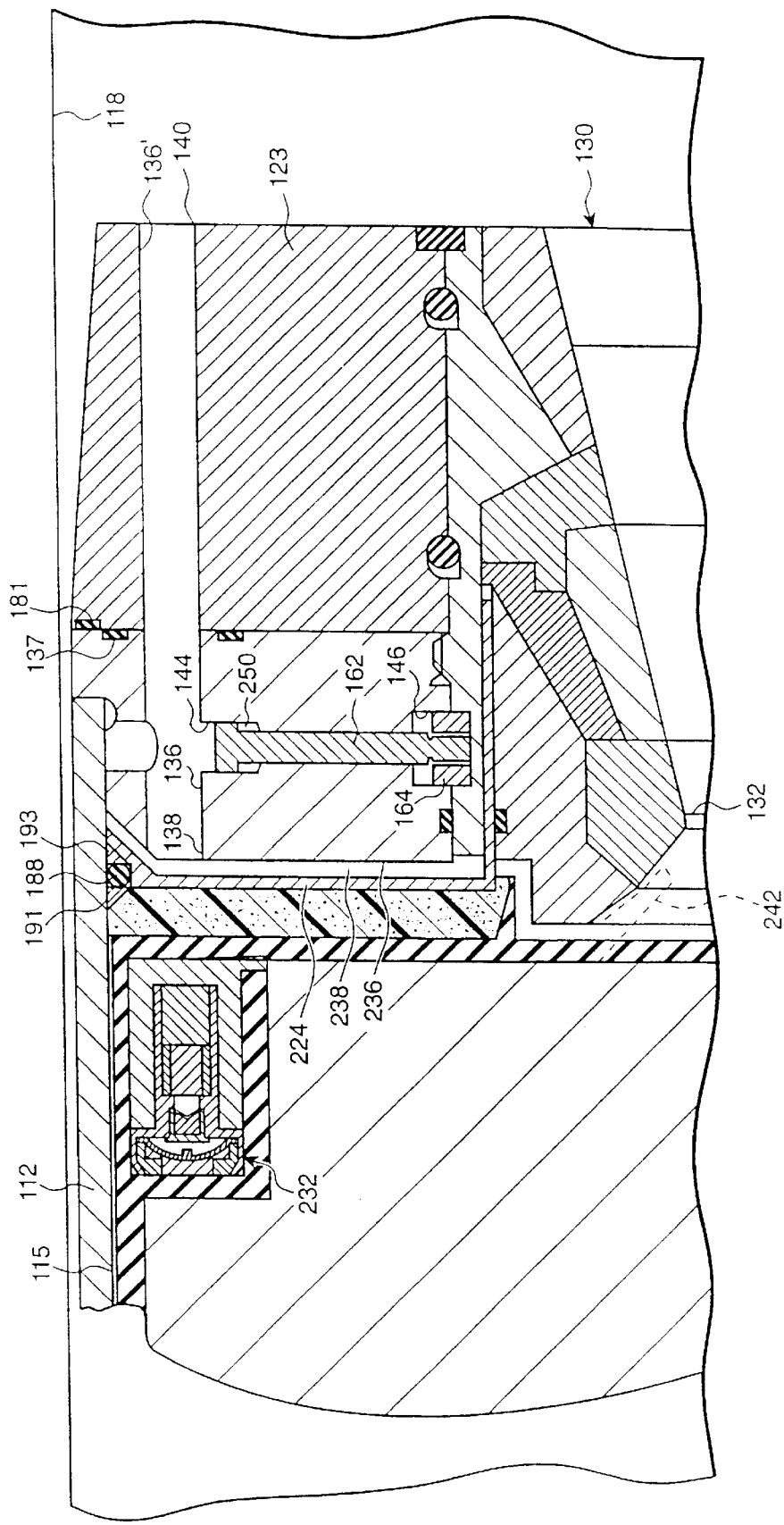
FIG. 7 is a cross-sectional view of a portion of the aft end of a case cylinder showing the actuated position of a high capability shear device.

The propellant grain 230 is positioned within the propellant chamber 120 and is surrounded by a rubber insulator 228. Preferably, the propellant grain 230 is bonded to the forward closure 6, shown in FIG. 1, of the propellant chamber 120. However, a gap 115, shown in FIGS. 5 and 7, is provided between the outer diameter of the propellant grain insulator 228 and the interior surface 116 of the case cylinder 112. This allows for thermal expansion and contraction of the propellant grain 230. The rubber insulator 228 is also bonded to the forward end and the cylindrical sides of the propellant grain 230. However, the aft end of grain 230 is only partially bonded to the interior surface of the aft area of insulator 228 as discussed further below.

One or more substantially axial passages, 136 in the aft closure 122 and 136' in a fin support structure 123, are provided that collectively extend from a forward end 138 of the aft closure 122 to an aft end 140 of the fin support structure 123. These axial passages and the nozzle throat 132 allow the propellant chamber 120 to communicate with the gun bore 118 while the rocket is within the gun bore 118. In a presently preferred embodiment, the number of axial passages 136 and 136' is four and they are equally spaced circumferentially about nozzle assembly 130.

Each axial passage 136 connects with a radially extending passage 142 extending between a first end or enlarged bore 144 and a second end in the form of a circumferential groove 163 further described below. Each passage 142 is in communication with an axial passage 136 when rocket motor 3 is fully assembled and the groove 163 is located adjacent a correspondingly shaped groove seat 214 configured within an exterior surface of the nozzle assembly 130. Groove seat 214 is preferably an annular or circumferential groove that extends around nozzle member 210.

In this alternate embodiment, the gun-launched rocket motor 3 includes two retaining devices for securing the nozzle assembly 130 to the aft closure 122. One has a low load capability while the other has a high load capability.

The first retaining device includes a low load capability male/female thread connection portions 150/151, respectively, that together secure the nozzle assembly 130 relative to the aft closure 122. It should be understood that the male portions 150 of the low capability retaining device are comprised of spaced apart segments whereas the female portion 151 preferably comprises a continuous thread-type groove extending about the aft portion of inner surface 126 of the aft closure member 122. It should also be understood that the total circumferential length of the male portions 150 comprise about one-quarter of an inch or less where maraging steel is used. This is all that is required since the metal parts used in the rocket motor are all predominantly 18 Ni 300 maraging steel whereby a relatively small amount of metal interlocking the threads is required to provide the desired amount of low shear strength protection. Included with the male portion 150 is at least one bottoming interface 152 that will contact and bottom out against a wall 153 in the female thread portion 151. During the installation of nozzle assembly 130 in aft closure 122, the nozzle assembly will be turned or rotated to interengage the male/female threaded connection portions 150/151. Rotation will continue until the bottoming interface 152 contacts wall 153 at which time rotation will stop and nozzle assembly 130 will be fully engaged with aft closure 122. This will also ensure that the circumferential groove seat 214 will be precisely aligned with the circumferential groove 163.

The second retaining device is a high shear capability retainer that is actuated by gun pressure upon firing of the gun. At the time of gun firing it is necessary to positively secure the nozzle assembly 130, and anything connected thereto to the aft closure 122. The second retainer provides this positive lock and comprises a piston rod 162, as shown in FIG. 5, that is positioned within each radially extending passage 142. Each piston rod 162 is appropriately engaged with a segmented arcuate rail member 164 that fits completely in a seat comprising the circumferential groove 163 formed around the interior surface 126 of aft closure 122 when disengaged. When engaged, the rail member segments 164 will collectively form a circular member within a corresponding circumferential groove seat 214 in the structural member 210 of the nozzle assembly 130. Groove seat 214 has a radial depth of about 0.075 inch and an axial width of about 0.29 inch. Surface 126 also includes a seal member 165 and the female portion 151 of the low shear capability retaining thread.

A first headed end 166 of the piston rod 162 will be in communication with gun bore gas pressure through each axial passage 136/136' and radial passage 142. A second end 168 of the piston rod 162 is located adjacent the groove seat 214. The piston rod 162 is capable of movement between a normal or disarmed position, wherein each rail member segment 164 does not engage the seat 214, and an actuated position in which each of the rail member segments 164 fully engages the seat 214. In the actuated position, rail members 164 collectively prevent relative axial movement between the aft closure 122 and the nozzle assembly 130;

As explained above, the aft end of the case cylinder 112 is closed by an aft closure, shown at 122, that is welded to the case cylinder 112 and the nozzle assembly 130 is attached to aft closure 122. In the final stages of assembly of the rocket motor 3, a fin support structure 123 will be located aft of the aft closure 122 and about the exposed exterior portion of nozzle assembly 130. Ultimately, the fin support structure 123 will rotate relative to nozzle assembly 130. Consequently, the attachment therebetween includes ball bearings 131 and an aft end seal 133, that is suitably attached to the nozzle assembly 130 as by, for example, a rubber-to-steel adhesive, such as Hysol, EA934NA. In addition, O-rings can be positioned between the nozzle assembly 130 and the fin support structure 123. As is also shown in FIG. 5, the fin support structure 123 includes an interior surface 129 in which an annular O-ring 181 is positioned in a groove 133. O-ring 181 will seal against an aft surface 135 of the aft closure 122 radially outboard of an O-ring 137 that extends around each of the passageways 136 and fits within a groove 139. Each O-ring 137 and 181 provides suitable compression sealing between the various mating parts. As shown in phantom, the fin support structure 123 also includes a hub 125 and a slot 127 formed about hub 125 into which a fin can be movably accommodated.

It is desirable that there be relative rotation by the fin support structure 123 and nozzle assembly 130 only following the rocket leaving the gun bore. To releasably lock the fin support structure 123 in place, axial pins and holes operating in the mating surfaces 129 and 135 (not shown) will permit the fin support structure 123 to be properly positioned so that passages 136' will precisely align with passages 136. Such pin connections will be sufficiently short so that the fin support structure 123 will be able to move aftward a few thousandths of an inch to clear such axial pins and permit ball bearings 131 to function and thus the fin support structure 123 to rotate. To initially hold the fin support structure 123 axially in place, a series of radial bores can be made that will incorporate a pyrotechnic pin, one of which is shown in dotted line at 141. Such pins are conventional and it is not believed further discussion thereof is necessary.

The nozzle assembly 130 shown in FIG. 5 includes a forward end comprised of a conical entrance region 200 that joins with a cooperating conical surface 202 of an insulation member 204 positioned outboard of and adhesively bonded to nozzle pieces 203 and 207. Insulator 204 includes an outer peripheral surface 206 that has a seal member such as an O-ring 208 adjacent the forward end. An additional structural member of the nozzle assembly, generally indicated at 210, includes an interior surface 212 that is spaced from the outer surface 206 in order to define a gap 213 therebetween.

The nozzle member 210 provides the support for the nozzle pieces 203–205, 207, 209 and 211, and includes as well, on an outer surface 215, races or grooves for the ball bearings 131. The nozzle member 210 also includes, on its outer peripheral surface 215, the male portion 150 of the previously described low shear thread-type retaining device, as well as the circumferential groove seat 214 that cooperates with the high shear retainer, also previously described.

Figure 6:
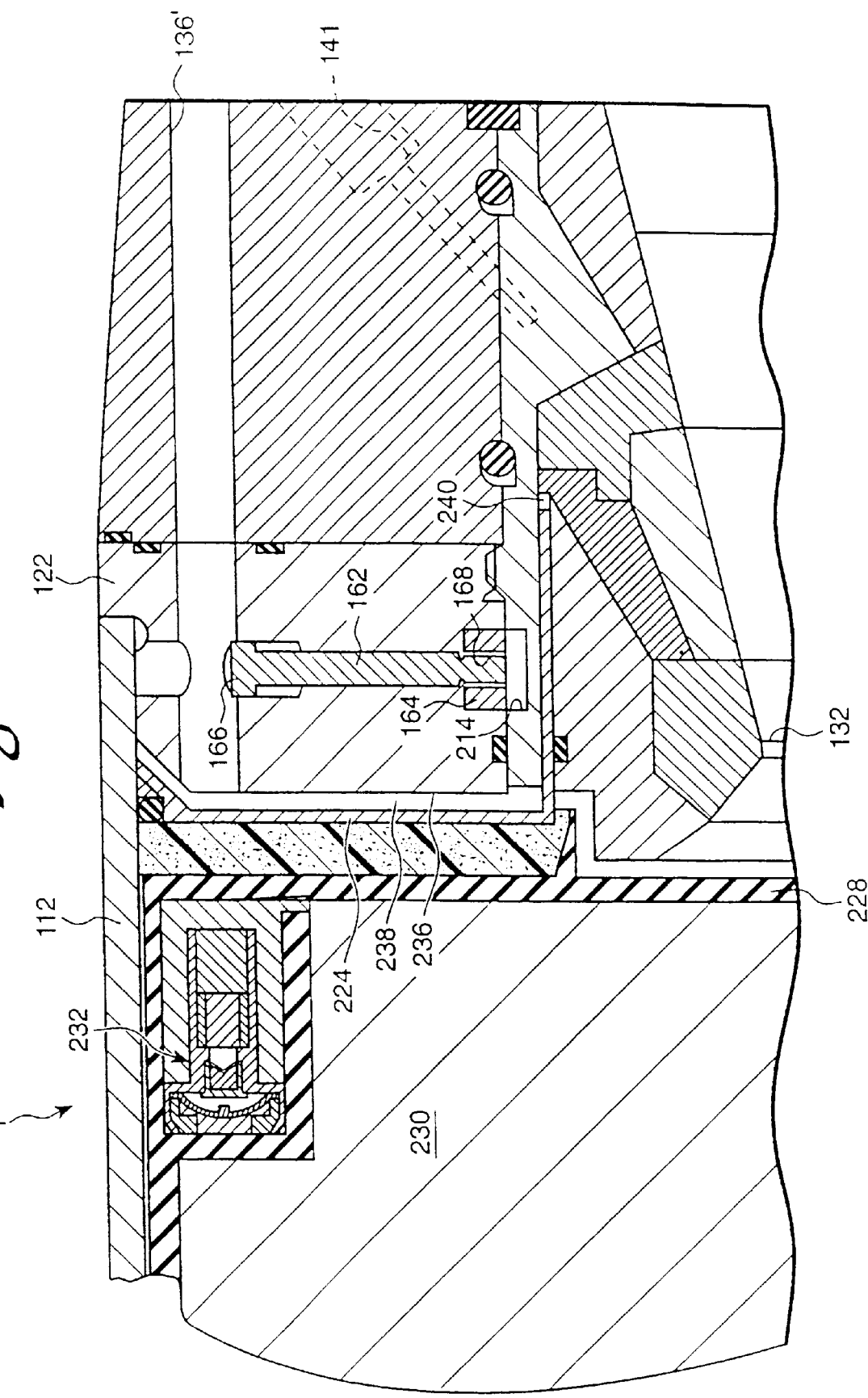
FIG. 6 is a cross-sectional view of a portion of the aft end of a rocket motor showing the nozzle assembly mounted to the aft end of the case cylinder.

As shown in FIG. 5, the nozzle assembly 130 has not yet been installed in the aft closure 122. The installed condition is shown in FIG. 6. Installation occurs by rotating nozzle assembly 130 within or relative to the aft closure 122 so that the male and female threads, 150 and 151, respectively, can mesh and form a tight engagement therebetween when the bottoming surface 152 engages wall 153. In the preferred embodiment, the fin support structure 123 will be attached at a subsequent time.

As shown in FIG. 6, the aft closure 122 and the fin support structure 123, respectively, and the nozzle assembly 130 have all been joined together. Thus, the low shear thread-type retaining device 150/151 is in place and operable with the high shear retaining device having yet to be deployed or activated.

As perhaps best shown at FIG. 5, the rocket motor designed according to the present invention includes an integral movable compression chamber forming piston, or bore rider, generally indicated at 220, that includes a cylindrical center section 222 and an annular plate portion 224 that extends radially outwardly from the top of center section 222. Plate portion 224 extends radially to the casing cylinder 112 where it is sealed by means of a suitable sliding seal 188 and a pair of anti-extrusion features 191 and 193 shown in FIGS. 7 and 8. The anti-extrusion features 191/193 preferably have a triangular cross-sectional slope and comprise a soft, or dead soft, flowable metal that will move together with seal 188 preventing extrusion whether the lower pressure is forward or aft of the plate portion 224 of the movable piston 220 and the associated insulator 226. Those skilled in the art will recognize that for a short time interval during gun launch, the gap 238 between the plate portion 224 of the movable piston or bore rider 220 and surface 284 of aft closure 122 will be subjected to a higher pressure than the gap between the OD of the propellant grain insulator 228 and the interior surface 116 of the case cylinder 112, and that during a short time interval after the projectile 1 leaves the gun bore 16, an opposite condition will prevail. The soft metal used for the anti-extrusion features 190/191 can be, for example, 1100 aluminum in the -O-condition.

Plate 224 is attached to a resin and fiber reinforced annular insulator disk 226. Disk 226 is preferably a laminated structure formed from layers of silica cloth and phenolic resin that have been bonded together and cured under suitable heat and pressure. Disk 226 is positioned adjacent the rubber insulator layer 228 that extends around the entire periphery of the grain 230. It should be noted that while the interior periphery of the rubber insulation 228 is bonded to the propellant grain 230, that bonding occurs throughout the entire grain except for the area between the igniter, generally indicated at 232, and the opposite side wall of case cylinder 112 to a point generally adjacent where the insulator material 228 curves as indicated at 234. Lack of a bond along the aft surface of grain 230 allows for repeatable ignition along that aft surface.

The central portion 222 of piston or bore rider 220 has a cylindrical shape and is slidably retained within the cylindrical slot 213 defined between surfaces 206 and 212 of the nozzle assembly 130. This position is shown best in FIG. 6.

It should also be noted, that there is a gap 238 provided between the aft surface of plate 224 and the forward planar surface 236 of the aft closure 122. Similarly, there is a gap 240 that exists between the aft-most edge of the cylindrical portion 222 of piston or bore rider 220 and the base of the cylindrical slot 213. The gap 240 has a longer length or a larger axial dimension than the axial dimension of gap 238 to assure that at a later point in time, plate 224 can fully seat against surface 236 which comprises the forward end of aft closure 122.

As noted above, the fin support structure 123 includes an axially extending bore 136'. A bore 136 is located in the aft closure portion 122. When these two sections are fully connected, as shown in FIG. 6, the axial bores 136 and 136' are co-axially aligned and together define a through passageway. The axial bore 136 also crosses a radially extending bore 142 in which the piston rod 162 is slidably retained.

FIG. 6 shows the condition that the rocket motor is in following completion of assembly into a storage ready condition. Should some inadvertent mishap cause the propellant grain 230 to ignite, the internal pressures will cause the low load capability threaded connection 150/151 to break thereby permitting the nozzle assembly 130 and the fin support structure 123 to be discharged creating a large opening at one end of the rocket motor 3, a situation similar to that shown in FIG. 5. The center of aft closure 122 will be sized to relieve pressures and avoid the creation of substantial thrust through the aft end of the case cylinder 112.

Figure 8:
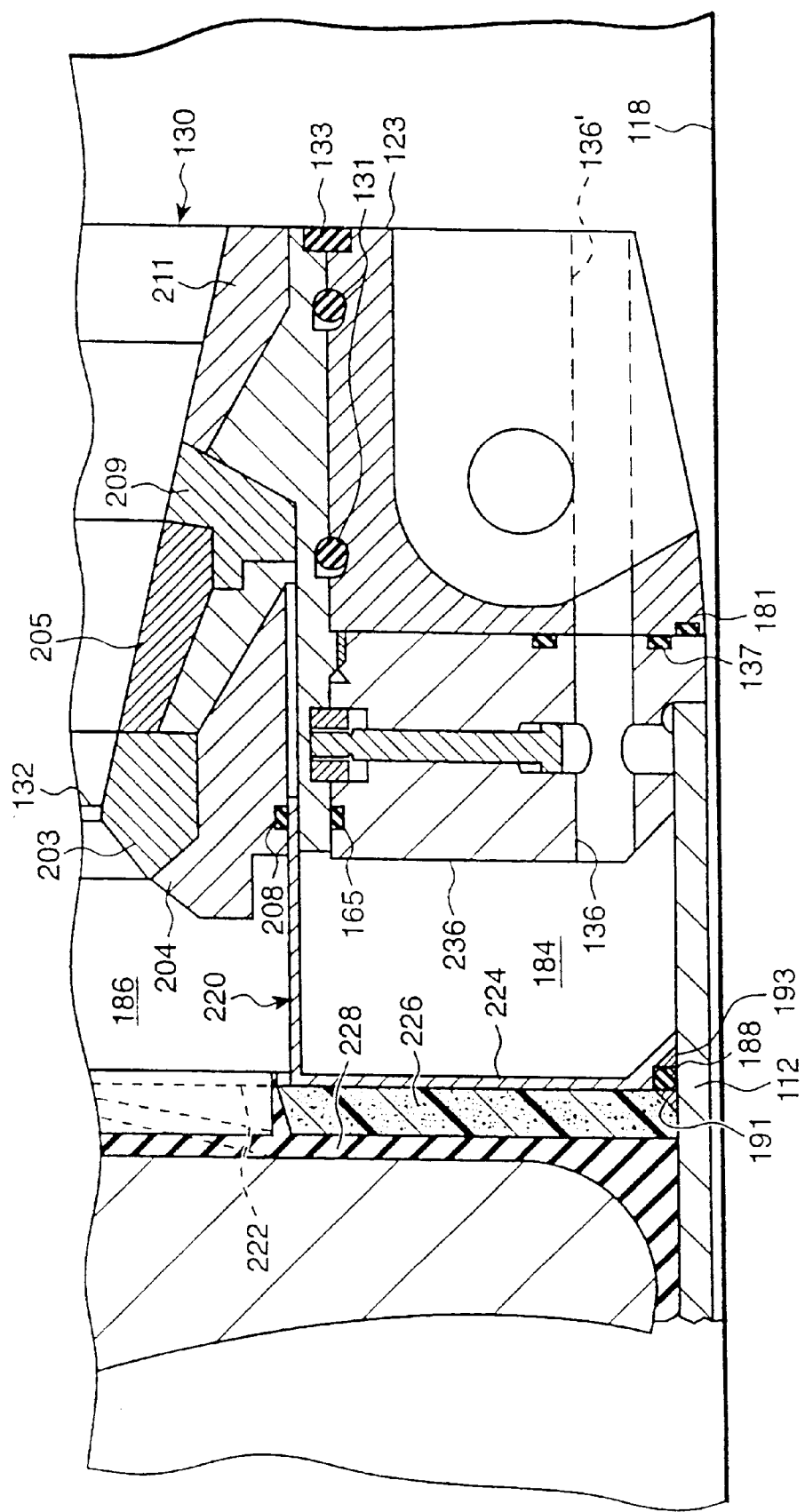
FIG. 8 is a cross-sectional view of a portion of the aft of a case cylinder during a gun launch.

Turning then to FIGS. 7 and 8 we see the conditions of the rocket motor at the time the propelling gun is fired. FIG. 7 shows the actuation of the high shear retaining assembly just after gun pressure has been applied to bores 136/136' and chamber 144. FIG. 8 shows the conditions within the rocket motor during the passage of the rocket down the bore of the gun and prior to discharge from the gun and ignition of the solid propellant.

In FIG. 7, the frictional effect of seal material 250 in chamber 144 below the headed end 166 has been overcome by the pressure from gun gasses flowing into passages 136/136'. The piston rod 162 has been driven radially inwardly and the high shear rail member 164 is seated within the groove 214. With the piston rod 162 and the high shear rail member 164 in their deployed or actuated position, the nozzle assembly 130, as well as the fin support structure 123, are secured in place. Thus, upon firing of the gun, initial pressure exerted by the gun gases will pass through the passageways 136/136' and seat the high shear retaining devices into their deployed positions as shown in FIG. 7.

The gun pressure varies as the rocket travels along the gun bore, initially rising perhaps as high as 68,000 psi, and then declining perhaps to less than 10,000 psi when the obturator exits the bore. The gun pressure will be applied both to the passageways 136/136', as well as to the nozzle throat 132. Thus, gun pressure will pass into the gap 238 beneath plate 224. This will cause the compression chamber forming piston or bore rider 220 to be moved axially forwardly causing the gap 238 to be enlarged into an annular compression chamber 184 formed between the aft surface of plate 224 and surface 236. Simultaneously, a central compression chamber 186 is also formed within the cylindrical portion 222 of piston or bore rider 220 aft of the rubber insulation 228 but forward of nozzle assembly 130. In addition, gun gases will pass around the exterior of the rocket 1 within the bore 118 pressurizing the entire region aft of obturator 5. Consequently, gas pressure will exist on the outside of the case cylinder 112, and within the case cylinder, specifically in annular compression chamber 184, and central compression chamber 186. As pressure rises, it is also possible for the central portion of the insulator 228 to be slightly domed inwardly as shown in dotted lines in FIG. 8. Such doming could also occur in the opposite direction, with the actual direction of movement depending on the current temperature of the propellant grain 230, the acceleration level prevailing at the particular moment, and whether the acceleration level during a previous moment was smaller or larger. Consequently, the central portion of the aft part of insulator 228 does not necessarily remain flat.

The compression chamber 184 is in communication with each axially extending passage 136 which permits gun pressure to enter the rocket motor and pressurize the compression chamber 184. The insulator 228, central cylindrical portion 222 and nozzle assembly 130 define a central compression chamber 186. The central compression chamber 186 is in communication with the nozzle throat 132 permitting gun pressure to pressurize the central compression chamber 186. Each axial passage 136/136' is configured to permit the annular compression chamber 184 to pressurize at substantially the same rate as the central compression chamber 186. The axial passages 136/136' are configured to enable pressurization and depressurization of compression chambers 184 and 186 within the rocket motor to occur at close to the same rate as the pressurization and depressurization of the cavity between the case cylinder outer surface 114 and the gun bore inner surface 118. Consequently, compression chambers 184 and 186 cooperate with the remaining rocket motor interior structure to thereby provide, in substantial measure, a way to counterbalance the gun pressure acting on the exterior surface 114 of the case cylinder 112. Thus, the pressure differentials across the case cylinder are diminished essentially to the hydrostatic pressure gradient in the propellant grain, zero at the aft end, and a small fraction of the gun pressure at the forward end.

When the rocket motor exits the breach of the gun, external pressure drops suddenly to ambient pressure and the pressure within the chambers 184 and 186 rapidly escapes through the axial passages 136/136' and the nozzle throat 132, and the piston or bore rider 220 translates aftward. When the rocket motor propellant grain 230 is ignited, later in flight, the seals 188 and 208 prevent combustion gases, caused by the burning propellant, from escaping out of any axial passage 136/136'. This assures that the pressures during rocket motor burn are controlled only by the nozzle throat. Also, the central portion of the aft part of insulator 228 is grooved or seamed so that upon ignition of the propellant grain 230 insulator 228 will petal or open in a flower petal-like manner, and drape onto the conical surface 202 as shown in dotted line at 242 in FIG. 8. This allows the propellant grain 230 to properly burn yet prevents the insulation from blocking the entrance to nozzle throat 132.

In order to reduce the weight of the rocket motor 3, and thus increase the range which the rocket can achieve, as well as to reduce the thickness of materials used in forming the rocket, the passageways 136/136', the nozzle throat 132, and the volume of the compression chambers 184 and 186 are sized so that the difference between pressures within compression chambers 184 and 186 and the gun pressures on the exterior of cylinder case 112 are minimized. The metal thickness need only be that which will have the capability of structurally withstanding the differential between inside pressures and outside pressures as the rocket travels through the bore of the gun. The pressure differentials acting on the case structure will be readily accommodated.

The diameter of the axial passageways 136/136' is about 0.24 inch and their lengths are approximately 0.94 and 1.62 inch, respectively. Those skilled in the art will recognize that the volumes of the compression chambers 184 and 186 will reflect the current average temperature of the propellant grain.

The side wall thickness for the piston or bore rider 220 will be approximately 0.050 inch, with this thickness being uniform both in the central cylindrical portion 222 as well as in plate portion 224. It should be understood that the annular compression chamber 184 is in communication with each of the axially extending passages 136/136' employed, through which the annular compression chamber 184 is pressurized. As noted previously, the aft surface of the rubber insulator 228, the upper portion of the nozzle assembly 130, and the interior of the cylindrical portion 222 of piston or bore rider 220, define the central compression chamber 186, which becomes the rocket motor combustion chamber when the propellant grain is ignited later in flight. This central compression chamber 186 is in communication with the nozzle throat 132 that permits gun pressure to pressurize that central chamber 186. Thus, each of the actual passages 136/136' is configured to permit the annular compression chamber 184 to pressurize at substantially the same rate as that of the pressurization rate for the central chamber 186. Thus, axial passages 136/136' are configured in size to enable both the pressurization and depressurization of the compression chambers 184 and 186, respectively, within the rocket motor to occur at close to the same rate as the pressurization and depressurization of the cavity between the case cylinder's outer surface 114 and the gun bore's inner surface 118.

It should also be understood that the plate 224 of piston 220, along with the reinforced plate 226 and the rubber insulator 228, when they are driven axially as shown in FIG. 8, will compress the slightly compressible solid propellant, not only against the forward closure portion of the rocket motor, as shown in FIG. 1, but also the interior surface 116 of the case cylinder 112. This use of compression chambers 184 and 186, with the axially moving piston 220, will substantially counterbalance gun pressure acting on the exterior surface 114 of the case cylinder 112. Thus, when the gun pressure reaches its maximum level, pressure differentials across the case cylinder are diminished to merely the hydrostatic pressure gradient that exists in the propellant grain, zero at the aft end, and a small fraction of the gun pressure at the forward end.

During gun launch, the rifling within the gun bore, and the torque transmitted through the obturator, cause the projectile to spin rapidly as it exits the tube. The high compression at the interface between the case cylinder inner surface and the propellant grain insulator, induced by admitting gun pressure to the interior of the rocket motor, is more than sufficient to allow the needed spin-up torque increment to be transmitted by friction to the propellant grain.

Figure 9:
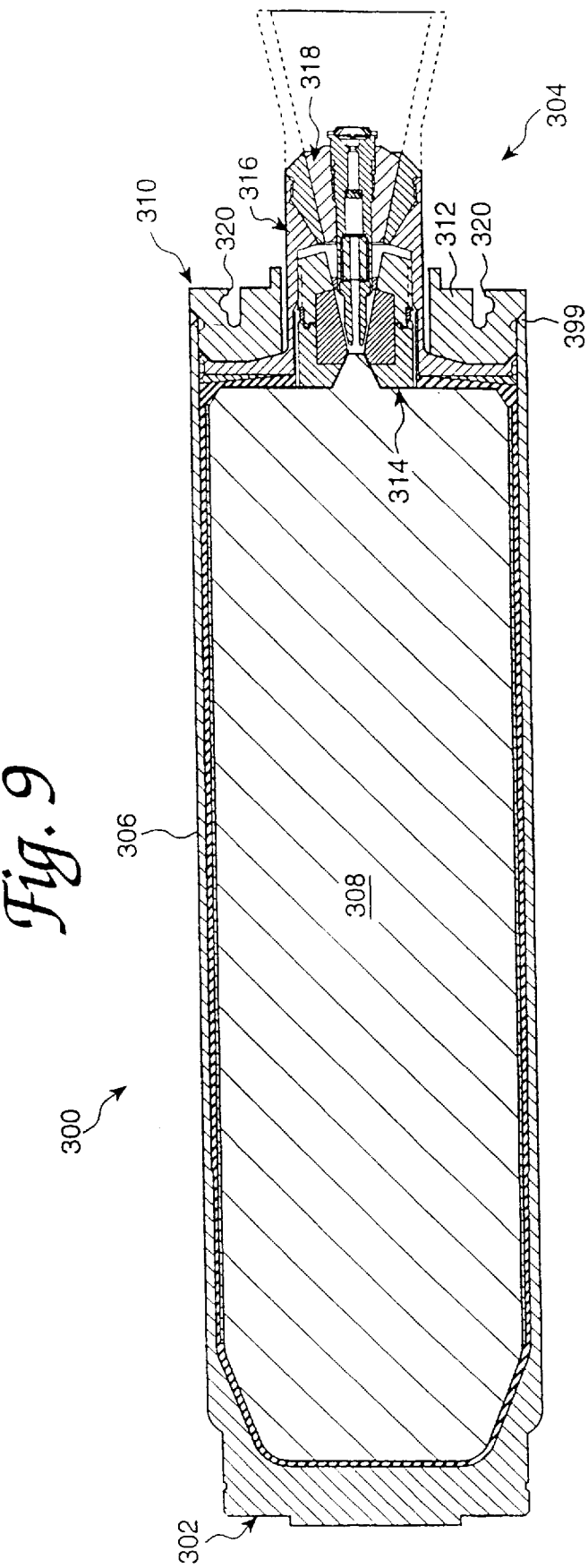
FIG. 9 is a cross-sectional view of another embodiment of an improved rocket motor in an at rest condition.
Figure 10:
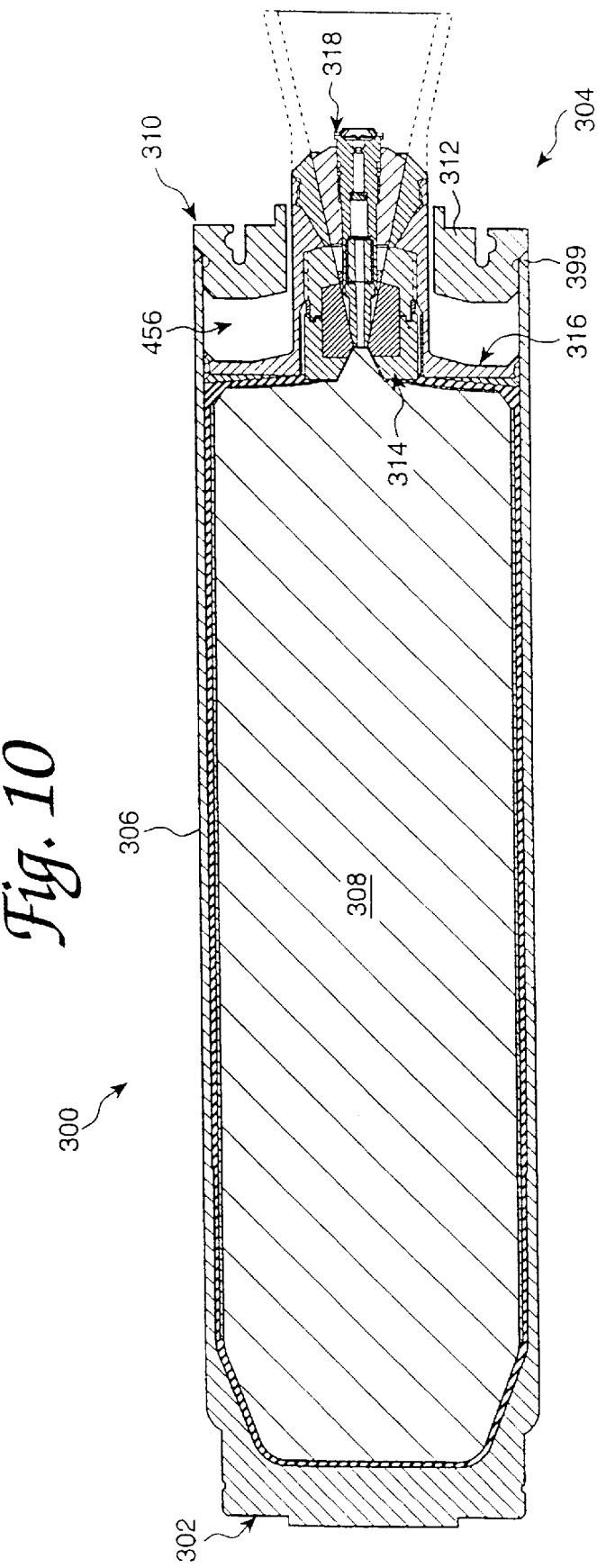
FIG. 10 is another view of the rocket motor of FIG. 9 within a sliding piston moved to a maximum pressure condition.
Figure 11:
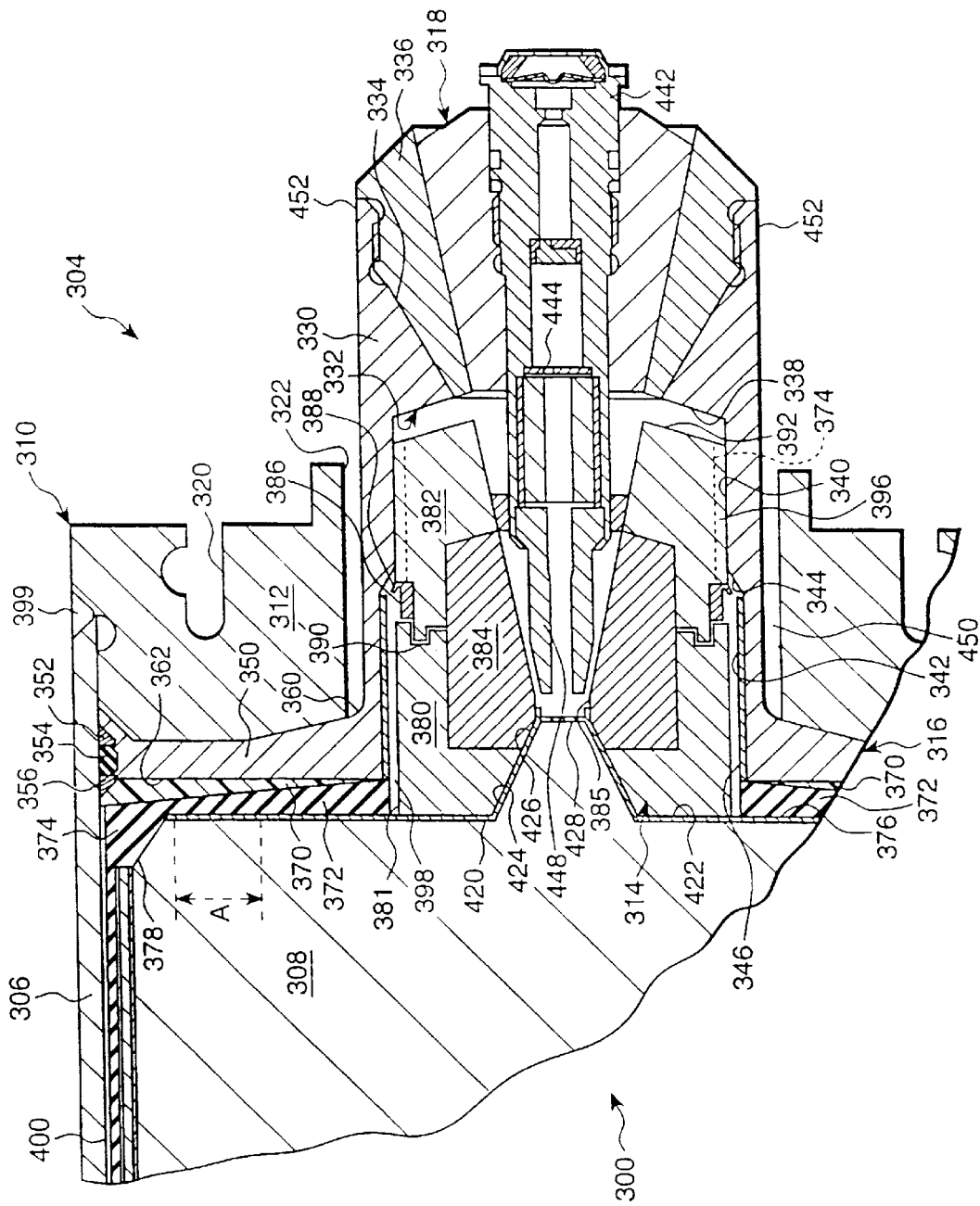
FIG. 11 is an enlarged partial view of the aft end of the rocket motor shown in FIG. 9.
Figure 12:
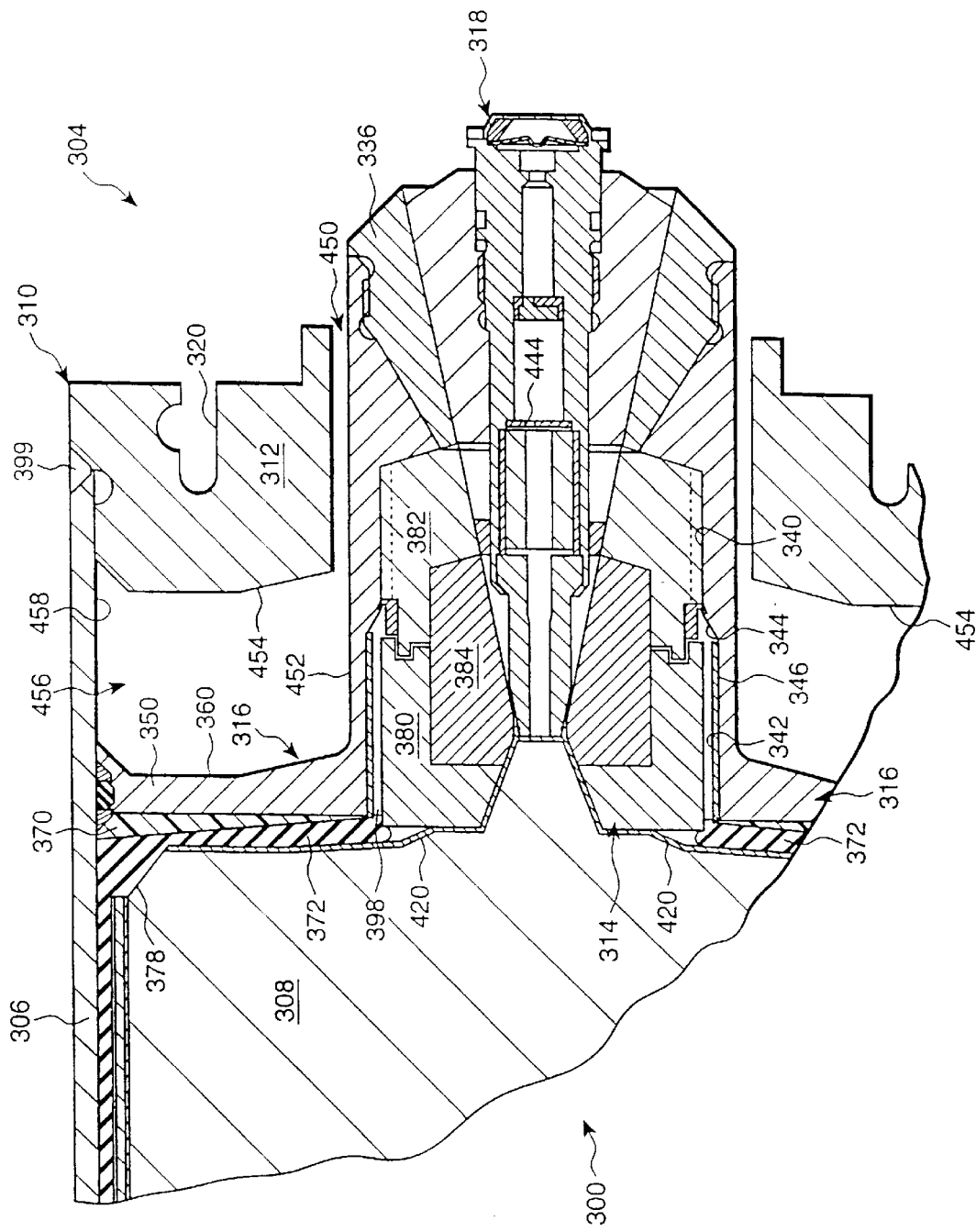
FIG. 12 is an enlarged partial view of the aft end of the rocket motor shown in FIG. 10.

Turning now to the next embodiment, specific reference to FIGS. 9–12 shows an improved rocket motor 300. FIGS. 9 and 11 show that rocket motor in an at rest condition as initially built and, in particular, an enlarged view of a portion of the aft end is shown in FIG. 11. FIGS. 10 and 12 show the rocket, and in particular an enlarged partial view of the aft end, at peak acceleration where pressures are at a maximum within the bore of a launch weapon.

Rocket motor 300 includes a forward end, generally indicated at 302, an aft end, generally indicated at 304, an outer case 306 that encloses propellant or propellant grain 308.

An aft closure assembly, generally indicated at 310, includes an aft closure member 312 mounted within and welded at 399 to the aft end of case 306. A nozzle assembly is generally indicated at 314, a sliding piston is generally referenced at 316 and an igniter assembly is generally shown at 318. As is true of the foregoing embodiments, suitable flight control fins and a rotatably mounted attachment housing therefor (not shown) can be mounted at the aft end 304, using an annular bearing race 320 provided in the aft closure member 312 so that such fins mounted in the housing can deploy by swinging outwardly and the housing can spin, as is both necessary and appropriate, once the rocket leaves the bore of the launch weapon.

With reference to FIGS. 9 and 11, and principally FIG. 11, the aft closure member 312 is provided with an internal cylindrical bore 322.

The sliding piston 316 includes a main cylindrical body 330 having an external or outer surface 452 and an internal chamber 332 and a sloping interior rear surface 334 to which an exit cone 336 is fixed by conventional techniques including having the exit cone 336 screwed and, in some cases, glued to the sliding piston 316. The internal chamber 332 is defined by an aft wall 338, and a cylindrical interior that is formed by an aft cylindrical interior wall 340, a forward cylindrical wall 342, that has a larger internal diameter than the aft cylindrical wall 340, and a tapered interconnecting wall 344 that extends therebetween. The forward cylindrical wall 342 can, although need not necessarily, be provided with an adhered rubber sheet insulator extending there about as is indicated at 346.

The sliding piston 316 also includes a flange 350 that extends radially outwardly from the cylindrical body 330 to engage the inner surface of case 306. Three seal components including outboard aluminum rings 352 and 356 and a centrally positioned rubber O-ring 354, are similar to those previously described. The aluminum rings 352 and 356 are provided to maintain the integrity of the O-ring 354 and to keep it from extruding during movement of the sliding piston 316. These seal components are also provided at the outer periphery of flange 350 to provide the sliding contact between the outer periphery of that flange 350 and the internal surface of case 306 as the piston 316 moves from an aft position to a forward position, that is from a position shown in FIG. 9 to that shown in FIG. 10, as the rocket is internally pressurized during gun launch, and after the propellant or propellant grain 308 is compressed axially.

The radially extending flange 350 has a rear or aft surface 360 and a forward surface 362. A hard plastic insulator 370 is mounted to forward surface 362 and in turn a tapered rubber insulator 372 is mounted to the hard plastic insulator 370. The hard plastic insulator 370 has a tapered cross sectional shape that increases from the interior toward the exterior with its thickest dimension being adjacent case 306. The tapered rubber insulator 372 is characterized by a tapered shape opposite to that of the hard plastic insulator 370 in that its largest dimension, in the section that is tapered, lies adjacent the nozzle assembly 314 and then tapers, in an outward direction, down to its smallest dimension at the point where the insulator is formed with a triangular shaped corner portion as shown at 374 that has an interior angled surface 378.

Nozzle assembly 314 is comprised of a forward nozzle insulator 380, an aft nozzle insulator 382 adhesively bonded to a tungsten throat insert 384 but not to each other, and an annular nozzle seal 386 that includes a lip seal 388 extending or projecting radially outwardly from the aft edge and adhesively bonded to the aft nozzle insulator 382. The forward and aft nozzle insulators, 380 and 382, respectively, are given a tongue and groove interlocking structure, as shown at 390 to minimize raidation damage to the rubber sheet insulator 346 on the sliding piston 316.

The aft nozzle insulator includes an angled aft surface 392 and has a cylindrical outer surface, shown by dotted line 394, and a series, preferably three, of outwardly projecting ribs 396 that engage the aft cylindrical wall 340 of the sliding piston 316. When three such ribs are employed they can be spaced 120° apart. Consequently there is a gap between aft cylindrical wall 340 and outer surface 394. Similarly, there is a gap 398 between the forward cylindrical wall 342 and the outer cylindrical surface 381 of the forward nozzle insulator 380. It should also be noted that the interior of both the tapered rubber insulator 372 and the hard plastic insulator 370 terminate at gap 398 and define the forward end portion of gap 398.

Figure 13:
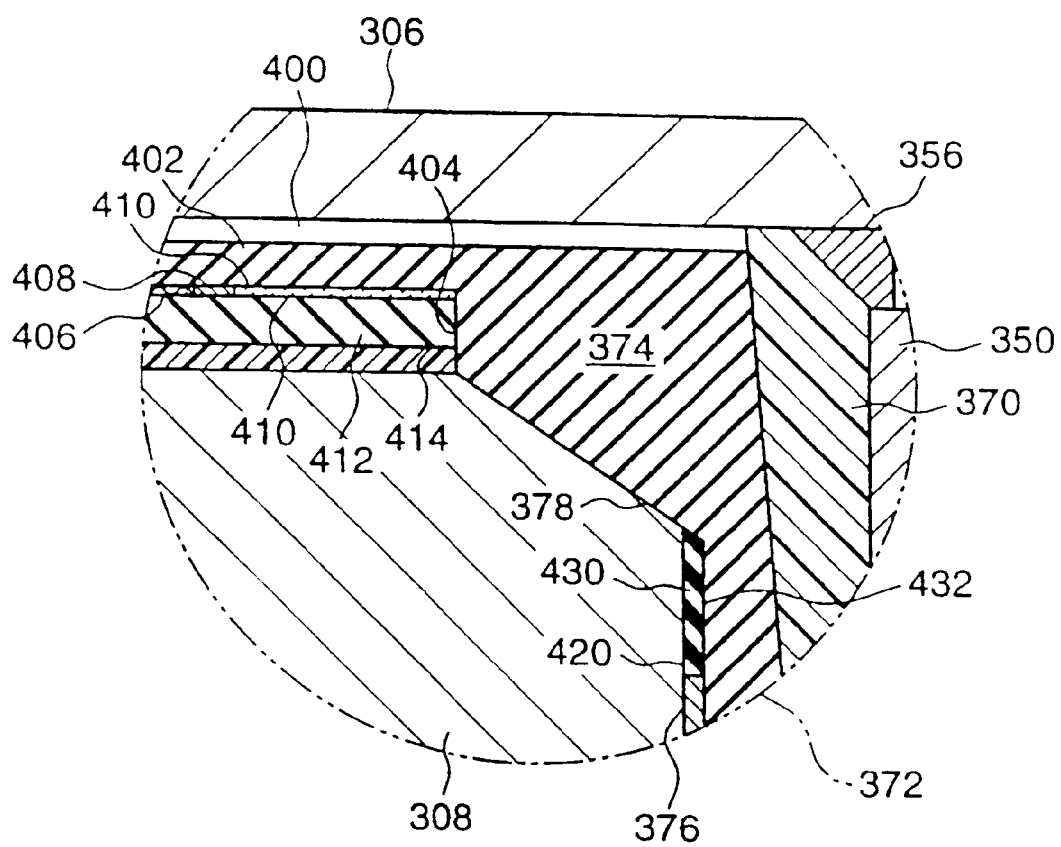
FIG. 13 is an enlarged cross-sectional view of a portion of FIG. 11.

As shown in FIG. 13, case 306 serves as the outer container for the rocket. Inboard of the interior of case 306, forward of the hard plastic insulator 370 is a void space 400 and then an extension 402 of the tapered rubber insulator 372. A shoulder 404 is formed on the interior side of extension 372 and mounted on inside extension 402, in series, are a bleeder cloth layer 406 that extends along a portion of the extension 402 with the bleeder cloth layer ending with a cylindrical inhibitor 408 that has a teflon tape layer 410 covering both its inside and outside surfaces. Inboard of the bleeder cloth layer 406 is a cylindrical rubber type insulator 412 with a polymer or similar type liner, 414 bonded to the propellant 308 through an adhesive, that covers and extends around the full outer surface of the propellant grain 308 forward of the angled surface 378. From FIG. 9 it can be seen that liner 414 extends around propellant 308 and that extension 402 extends along case 306 almost to a point adjacent the forward end 302.

It should be understood that the exact materials used to surround and insulate the propellant grain 308, their arrangement and dimensions may vary depending upon the type of propellant used and that these elements will be known to those skilled in this art.

A rubber sheet nozzle insulator 420, shown in FIG. 11, extends across the aft end of the propellant 308 and along the forward surface 376 of the tapered rubber insulator 372, along the forward surface 422 of the forward nozzle insulator as well as along the angled inner surface 424 thereof. The rubber sheet nozzle insulator 420 covers the angled forward inner surface 426 of the tungsten throat insert and stops at a point adjacent the narrowest part of the nozzle throat 385 where the rubber sheet nozzle insulator 420 is sealed by an inhibitor 428 formed from liquid rubber that is poured in place and will cure at room temperature. Between sheet insulator 420 and the tapered rubber insulator 370 an additional bleeder cloth 432 is shown as extending through a portion of the region between the angled or beveled surface 378 and the annular gap 398. This bleeder cloth 432 may have an annular form or be comprised of strips. The region along the aft side of rubber sheet nozzle insulator 420 where bleeder cloth 432 is positioned is shown at "A" in FIG. 11. The aft surface of the rubber sheet nozzle insulator 420 is suitably bonded to a portion of surface 376 and to surfaces 422, 424 and 426; the forward side of the rubber sheet nozzle insulator 420 contacts and is secured to the aft surface of propellant 308. Gases resulting from an inadvertent or abnormal burn, initiated by external heating of case 306, therefore propagate and vent gases aftward through bleeder cloth 406 or along the liner 414, across the unbonded propellant/insulator surface 378, to the aft of or, in view of the figures, the right side of the rubber sheet nozzle insulator 420, and escape through annular gap 398 without penetrating between the rubber sheet nozzle insulator 420 and the forward nozzle insulator 380. During normal burns, which initiate at the aft end of the propellant 308, the burn path can proceed along the forward side of the rubber sheet nozzle insulator 420. Both of these burn sequences are more fully described below. Techniques for bond surface preparation and the selection of adhesive formulations, compatible with propellant and insulator materials, which will assure vent path functions as herein described, are well known to those skilled in this art.

Consequently, as shown in the figures, the propellant 308 rests against the above noted surfaces and a conical portion extends to the nozzle throat.

The rubber sheet nozzle insulator 420 also extends across and blocks the entrance to gap 398. With reference to FIG. 13, the rubber sheet nozzle insulator 420 begins adjacent the corner defined between the surface 378, which lies next to and unbonded to propellant 308, and bonded surface 376. Provided as part of the outer peripheral part of rubber sheet nozzle insulator 420 is an inhibitor area 430, that extends radially inwardly a limited distance. On the aft side of this area lies a section of bleeder cloth 432 that also extends radially inwardly for another limited distance as shown at A in FIG. 11. This bleeder cloth 432 is preferably formed from a fabric woven from a synthetic material, such as, for example, polypropylene, nylon, or other low melt temperature fiber. From the point where bleeder cloth 432 ends the rubber sheet nozzle insulator 420 is attached to the remaining portions of forward surfaces 376,422, 424 and 426 in a way that will allow abnormal burns to proceed on the aft side thereof and normal burns on the forward side thereof.

By employing these structural features this rocket motor design satisfies certain insensitive munitions (IM) requirements, that help assure safe storage, by employing inter-related features of the insulators 370 and 372 positioned forward of the sliding piston 316, the sliding piston 316 itself, the nozzle assembly 314 and its interaction within the sliding piston 316, the rubber sheet nozzle insulator 420, the limited region of bleeder cloth 432 and their bonded relationships that will allow a sequence of events to proceed that will assure IM protection as well as safe, faultless normal propellant ignition.

How this system operates will now be described and the foregoing IM protection will become clear. As noted above, the rubber sheet nozzle insulator 420 overlies a section of bleeder cloth 432 positioned along a limited region of forward face 376 of the tapered rubber insulator 372 adjacent the outer portion of that face 376. In an abnormal burn or ignition situation, such as could occur due to external case heating, it is proposed that the burn path be on and extend along the aft side of the rubber sheet nozzle insulator 420. With such an abnormal burn starting on the exterior of the propellant, the burn or fire path will propagate along the interior surface of extension 402 and then along the beveled or sloping surface 378. When the burn reaches the outer peripheral end of the rubber sheet nozzle insulator 420 there will be sufficient heat to easily melt the bleeder cloth 430, due to the gases being generated at thousands of degrees above the melt or decomposition temperature of bleeder cloth 432. As the bleeder cloth 432 melts or decomposes a space or cavity is opened on the aft side of the rubber sheet nozzle insulator 420. Due to this cavity the burn or fire path will propagate radially inwardly and as it moves it will peel the rubber sheet nozzle insulator 420 away from the forward face 376 of the tapered rubber insulator 372 until the peeling process reaches the cylindrical gap 398. At this point a vent path, that starts with the cylindrical gap 398, is opened. The accumulating gases will flow aft through gap 398 and then into the open space about nozzle seal 386 and then along the cylindrical space between outer surface 394 and aft cylindrical wall 340. By having gases vent through gap 398, the burn will be kept away from the nozzle assembly 314/ propellant 308 attachment area.

The vent path will desirably extend to the atmosphere but that path remains blocked by the igniter assembly 318. The bond between the igniter assembly 318 and the interior conical surface 440 of exit cone 336 is provided by a conventional soft and frangible adhesive thereby making this bond one that can break and yield. When a sufficient pressure builds the entire igniter assembly 318 will be expelled by the accumulated gases thus fully opening the vent path out of the aft end of the rocket motor 300 to the atmosphere. Subsequent gases being generated by the abnormal burn will be exhausted along the same vent path.

The annular space defined by cylindrical gap 398 and the space around outer surface 394 is, shown as being about ten (10) times the size of the nozzle orifice at the nozzle throat. By adjusting this ratio, the thrust resulting from abnormal burn can be varied to provide the desired level of initial protection.

Since the thin rubber sheet insulator 346, overlying forward cylindrical wall 342, is poor protection for that wall against rocket motor propellant gases flowing at high velocity, the gases will penetrate this thin wall 342 very quickly, resulting in the destruction of at least a portion of the thin wall 342 and the ejection of the aft portion of the sliding piston 316 together with the nozzle assembly 314, exit cone 336 and the whole igniter assembly 318, all of which depart as a unit. Thereafter, the exhaust area available will be so large that the propulsive force will be quite small.

By having the burn, and thereby the vent path functioning on the aft side of the rubber sheet nozzle insulator 420, the IM requirement of having a safety release capability built into the rocket motor will have been achieved. The aft side vent path also assures that the gases resulting from an abnormal propellant burn will not pass through the nozzle throat but, rather, around the outer periphery of the nozzle assembly 314.

The igniter assembly 318 is held in place by a frangible adhesive as noted previously. Included as part of the igniter assembly 318 is a forward nozzle 440 and a main body 442 which contains a conventional time delay ignition train 444 positioned aft of the nozzle 440.

With reference to FIG. 11 it can be noted that another annular gap 450 is defined between the exterior surface 452 of sliding piston 316 and the internal bore 322 of the aft closure member 312. During normal operation, the rocket motor 300 will be launched, as discussed previously from a launch weapon such as a five inch naval gun. As a result of such a gun launch, and as gun gases are generated within the bore of the gun, by the gun propellant (not shown) aft of the rocket motor 300, such gun gases will enter annular gap 450 and strike against and pressurize the aft surface 360 of the flange 350. The imposing of such axial forces on the sliding piston 316 moves that sliding piston 316 from an at rest position, shown in FIGS. 9 and 11, toward and ultimately to the maximum pressure position shown in FIGS. 10 and 12 as the propellant 308 deformes radially to completely fill the void space 400 shown in FIGS. 11 and 13.

As initially constructed, aft surface 360 of flange 350 will not fit exactly against the forward surface 454 of the aft closure member 312. The axial force associated with the gun propellant gases entering annular gap 450 and striking the aft surface 360 of flange 350 will move the sliding piston 316 forward, thereby creating an enlarged aft cavity 456. As the sliding piston moves forward the outer edge of flange 350 slides along the inside surface 458 of case 306, guided by seal components 352 to 356. The axial force on sliding piston 316 is transmitted through the hard plastic insulator 370 and the tapered rubber insulator 372, compressively loading propellant 308. The tapered rubber insulator 372 deforms as shown in FIG. 12, with a portion of the interior thereof being moved toward and into gap 398 and possibly even along forward surface 424 of the forward nozzle insulator 380.

The changing shape of the tapered rubber insulator 372 will cause the initially planar aft surface of the propellant, as it is compressed, to become dished or formed with a slight convexity, shown in FIG. 12, thereby applying force to forward nozzle insulator 380. This force causes relative movement between the internal chamber 332 of the sliding piston 316 and the nozzle assembly 314 due to a combination of high inertia loading associated with launch and the counter compressive forces acting on the nozzle assembly 314 from propellant 308. This relative movement will position the nozzle assembly 314 aftward within the internal chamber 332, as is also shown in FIG. 12.

When the nozzle assembly 314 is fully seated within chamber 332 surface 392 of the aft nozzle insulator 382 (FIG. 11) will lie in contact with surface 338 of the sliding piston 316. As this relative movement takes place the lip seal 388 will contact and grip a portion of the forward part of cylindrical wall 340 thereby providing a holding force to maintain the moved position of the nozzle assembly 314 within internal chamber 332.

The combined effect of such movement of the nozzle assembly 314 and the compression and flow of the material forming the tapered rubber nozzle insulator 372 blocks the IM vent path previously described.

As gun-launch concludes, gun gases that entered the motor 300 through annular gap 450 will depart through that same annular gap 450 and forces acting on the aft surface 360 of the flange 350 of the sliding piston 316, and within cavity 456, will progressively lessen. Compressive forces previously acting on propellant 308 will likewise progressively decrease and as these forces decrease, pressures interior and exterior of the case 306 will also progressively decrease. As a consequence, case 306 will have been able to tolerate the rise and fall of interior and exterior pressures associated with a gun-launched rocket.

As forces decrease, the axial force acting to compress the tapered rubber insulator 372 also lessen allowing it to return toward its uncompressed condition. As the tapered rubber insulator 372 returns to its former thickness, which was the largest part of its tapered shape, such movement will initiate aftward movement of the sliding piston 316 toward the aft closure member 312 and separate the bond provided between the propellant 308 and the forward surface of the rubber sheet nozzle insulator 420, to provide a path for burn propagation during normal ignition which will follow, with the aft surface of the latter remaining adhered to most of the forward face 424 of the forward nozzle insulator 380 and to surface 426 of the tungsten throat insert 384. At this point the propellant 308 is ready to be ignited for a normal burn.

The gun gases initiate burn of the time delay ignition train 444 within the igniter assembly 318, so that at a desired interval after the projectile leaves the bore of the launch weapon an igniting flame passes through inhibitor 428 and into contact with propellant 308. When this occurs, the rubber sheet nozzle insulator 420 will be adhered to the forward surfaces 424 of the forward nozzle insulator 380 and the angled forward surface of the tungsten throat insert 384. With those connections intact, normal burning of propellant 308 can proceed on the forward side of the rubber sheet nozzle insulator 420.

As propellant 308 ignites, the sliding piston 316, together with the now attached nozzle assembly 314 will slide aftward until the flange 350 again contacts the aft closure member 312. As propelling forces begin to rise, heat and pressure build within the nozzle assembly 314. Due to the frangible nature of the bond holding the igniter assembly 318 in place such pressures will also break that bond thereby expelling the entire igniter assembly 318 which opens the exit cone so that a normal burn can proceed.

It should be understood that various types of bonding can be used to both hold the rubber sheet nozzle insulator 420 in its desired position and to permit both normal and abnormal propellant burns and the consequential gas transmissions to flow along forward and aft surfaces or interfaces of that rubber sheet insulator 420 to permit the burn and venting processes to proceed as discussed above.

It should be appreciated that the apparatus and methods of the present invention are capable of being incorporated in the form of a variety of embodiments, only a few of which have been illustrated and described above. The invention may be embodied in whole or in part in other forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed:

1. A rocket motor comprising:
   propellant enclosed by a casing having a cylindrical region, a closed forward end and an aft assembly;
   said aft assembly including an aft closure member, provided with a central opening, secured to said casing within said cylindrical region;
   a sliding piston assembly slidably retained within said aft assembly and said casing so as to be movable between an at rest position adjacent said aft assembly and a maximum pressure position forward of said aft assembly in which the propellant is axially compressed to radially expand the propellant toward said casing;
   a nozzle assembly slidably mounted within a central bore of said sliding piston assembly so as to be movable between a forward vent path defining position and an aft vent path closing position;
   a propellant igniter assembly mounted within said motor; and
   a burn path structure arranged in combination with said sliding piston assembly and including at least a sheet insulator positioned between a portion of an aft face of the propellant and a forward face of said sliding piston assembly so that abnormal propellant burns will propagate along an aft interface of said at least a sheet insulator and normal propellant burns will propagate along a forward interface of said at least a sheet insulator.

2. The rocket motor of claim 1 wherein said sliding piston assembly includes a radially extending flange having a front face on which at least one tapered insulator is mounted, said at least a sheet insulator being connected to the propellant and said at least one tapered insulator.

3. The rocket motor of claim 2 wherein said at least one tapered insulator is comprised of rubber.

4. The rocket motor of claim 2 further including an additional tapered insulator positioned aft of said at lease one tapered insulator.

5. The rocket motor of claim 1 wherein said vent path is positioned radially outboard of said nozzle assembly.

6. The rocket motor of claim 5 wherein said propellant igniter assembly is frangibly mounted to said sliding piston assembly.

7. The rocket motor of claim 1 wherein said vent path comprises an annular gap defined between an outer surface of said nozzle assembly and an inner surface of said central bore.

8. The rocket motor of claim 7 wherein a portion of said sliding piston assembly adjacent said central bore is defined by a thinned wall that will break under abnormal burns thereby allowing the sliding piston assembly, aft of such break, to be expelled together with said nozzle assembly and said propellant igniter assembly.

9. The rocket motor of claim 2 wherein said at least one tapered insulator is compressible.

10. The rocket motor of claim 1 wherein said sliding piston assembly is spaced inwardly from said central opening defining an annular chamber open to the atmosphere through which said sliding piston assembly is pressured axially.

11. The rocket motor of claim 2 wherein said flange has a rear surface and said sliding piston assembly is spaced inwardly from said central opening defining an annular chamber open between said rear surface and the atmosphere.

12. The rocket motor of claim 1 further including a lock member to secure said nozzle assembly in its aft vent path closing position.

13. A rocket motor comprising:
   a casing enclosing propellant with a cylindrical region, a closed forward end and an aft assembly;
   said aft assembly comprising
      an annular aft closure member having a cylindrical opening provided therein, said aft closure member being fixed to said casing,
      a sliding piston including a flange radially extending to the cylindrical region and a cylindrical portion extending aftward extending in said cylindrical opening;
      said cylindrical portion being spaced radially inward from said aft closure member to define an axially extending open passage therebetween and from at least a portion of rear surface of said radially extending flange and the atmosphere;
      a nozzle assembly slidingly received within said cylindrical portion and moveable between a forward position, that defines an open gas vent path from inside said casing to the atmosphere, and an aftward position that closes the gas vent path;
      an igniter assembly positioned within an exit cone of said aft assembly so as to be operational through said nozzle assembly to ignite the propellant; and
      at least one insulator positioned between the propellant and said radially extending flange.

* * * * *